US012585177B2

(12) United States Patent　　　(10) Patent No.:　　US 12,585,177 B2

Inoue et al.　　　　　　　　　　　　(45) Date of Patent:　　　Mar. 24, 2026

(54) ADJUSTMENT SUPPORT DEVICE, ADJUSTMENT SUPPORT METHOD, ADJUSTMENT SUPPORT PROGRAM, AND PROJECTION SYSTEM

(71) Applicant: FUJIFILM Corporation, Tokyo (JP)

(72) Inventors: Kazuki Inoue, Saitama (JP); Tomonori Masuda, Saitama (JP); Akihiro Ishizuka, Saitama (JP); Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 470 days.

(21) Appl. No.: 18/170,276

(22) Filed: Feb. 16, 2023

(65) Prior Publication Data

US 2023/0194967 A1　　Jun. 22, 2023

Related U.S. Application Data

(63) Continuation of application No. PCT/JP2021/008308, filed on Mar. 3, 2021.

(30) Foreign Application Priority Data

Aug. 28, 2020　(JP) ................................. 2020-144976

(51) Int. Cl.
　　*G03B 21/14*　　　　　(2006.01)
(52) U.S. Cl.
　　CPC ........... *G03B 21/145* (2013.01); *G03B 21/14* (2013.01); *G03B 21/142* (2013.01); *G03B 21/147* (2013.01)
(58) Field of Classification Search
　　CPC ...... G03B 21/145; G03B 21/14; G03B 21/00; G03B 21/142; G03B 21/147; H04N 5/74

USPC ......................................................... 353/119
See application file for complete search history.

(56) References Cited

U.S. PATENT DOCUMENTS

| | | | |
|---|---|---|---|
| 2005/0237492 A1* | 10/2005 | Shinozaki ............ | H04N 9/3185 |
| | | | 353/69 |
| 2009/0244500 A1* | 10/2009 | Takara ................. | G03B 21/145 |
| | | | 353/119 |
| 2012/0200588 A1 | 8/2012 | Posa et al. | |
| 2017/0285875 A1* | 10/2017 | Hasuike ............ | G03B 21/2053 |

(Continued)

FOREIGN PATENT DOCUMENTS

| | | |
|---|---|---|
| JP | 2005-24668 A | 1/2005 |
| JP | 2005-43465 A | 2/2005 |

(Continued)

OTHER PUBLICATIONS

International Preliminary Report on Patentability (Form PCT/IPEA/409) for International Application No. PCT/JP2021/008308, dated Aug. 23, 2021, with English translation.

(Continued)

*Primary Examiner* — Magda Cruz

(74) *Attorney, Agent, or Firm* — Birch, Stewart, Kolasch & Birch, LLP

(57)　　　　　ABSTRACT

An adjustment support device includes: a processor configured to perform a control of: generating guide information indicating an operation method of an adjustment mechanism for adjusting inclination of a projection apparatus with respect to a reference surface based on inclination information indicating the inclination; and outputting the generated guide information.

18 Claims, 18 Drawing Sheets

(56)      References Cited

U.S. PATENT DOCUMENTS

| | | | |
|---|---|---|---|
| 2019/0281266 A1 | 9/2019 | Urano | |
| 2020/0107000 A1 | 4/2020 | Ishii | |

FOREIGN PATENT DOCUMENTS

| | | | | | |
|---|---|---|---|---|---|
| JP | 2009-237021 A | | 10/2009 | | |
| JP | 2009244410 A | * | 10/2009 | ............ | G03B 21/10 |
| JP | 2011099958 A | * | 5/2011 | ............ | G03B 21/10 |
| JP | 2018-78657 A | | 5/2018 | | |
| JP | 2019-161397 A | | 9/2019 | | |
| JP | 2020-30296 A | | 2/2020 | | |

OTHER PUBLICATIONS

International Search Report (Form PCT/ISA/210) for International Application No. PCT/JP2021/008308, dated May 11, 2021, with English translation.
Written Opinion of the International Searching Authority (Form PCT/ISA/237) for International Application No. PCT/JP2021/008308, dated May 11, 2021.

\* cited by examiner

FIG. 12

ADJUSTMENT SUPPORT DEVICE, ADJUSTMENT SUPPORT METHOD, ADJUSTMENT SUPPORT PROGRAM, AND PROJECTION SYSTEM

CROSS REFERENCE TO RELATED APPLICATION

This is a continuation of International Application No. PCT/JP2021/008308 filed on Mar. 3, 2021, and claims priority from Japanese Patent Application No. 2020-144976 filed on Aug. 28, 2020, the entire disclosures of which are incorporated herein by reference.

BACKGROUND OF THE INVENTION

1. Field of the Invention

The present invention relates to an adjustment support device, an adjustment support method, a computer readable medium storing an adjustment support program, and a projection system.

2. Description of the Related Art

JP2005-43465A discloses a configuration of determining whether or not a projector body is inclined with respect to a left-right direction in an inclination adjustment mode, and of projecting a schematic diagram illustrating how much the projector body is currently inclined.

SUMMARY OF THE INVENTION

One embodiment according to the disclosed technology provides an adjustment support device, an adjustment support method, a computer readable medium storing an adjustment support program, and a projection system that can facilitate inclination adjustment of a projection apparatus.

An adjustment support device according to one embodiment of the disclosed technology comprises a processor configured to perform a control of generating guide information indicating an operation method of an adjustment mechanism for adjusting inclination of a projection apparatus with respect to a reference surface based on inclination information indicating the inclination, and outputting the generated guide information.

An adjustment support method according to one embodiment of the disclosed technology comprises, by a processor, performing a control of generating guide information indicating an operation method of an adjustment mechanism for adjusting inclination of a projection apparatus with respect to a reference surface based on inclination information indicating the inclination, and outputting the generated guide information.

An adjustment support program, which is stored in a computer readable medium, according to one embodiment of the disclosed technology causes a processor to execute a process comprising performing a control of generating guide information indicating an operation method of an adjustment mechanism for adjusting inclination of a projection apparatus with respect to a reference surface based on inclination information indicating the inclination, and outputting the generated guide information.

A projection system according to one embodiment of the disclosed technology comprises a projection apparatus, and an adjustment support device that generates guide information indicating an operation method of an adjustment mechanism for adjusting inclination of the projection apparatus with respect to a reference surface based on inclination information indicating the inclination and outputs the generated guide information.

According to the present invention, an adjustment support device, an adjustment support method, a computer readable medium storing an adjustment support program, and a projection system that can facilitate inclination adjustment of a projection apparatus can be provided.

BRIEF DESCRIPTION OF THE DRAWINGS

FIG. 12 is a diagram (Part 2) illustrating an example of the end point fixing mode of the control device 4.

DESCRIPTION OF THE PREFERRED EMBODIMENTS

Hereinafter, an example of an embodiment of the present invention will be described with reference to the drawings.

<Schematic Configuration of Projection Apparatus 10 to which Adjustment Support Device of Embodiment is Applied>

Figure 1:
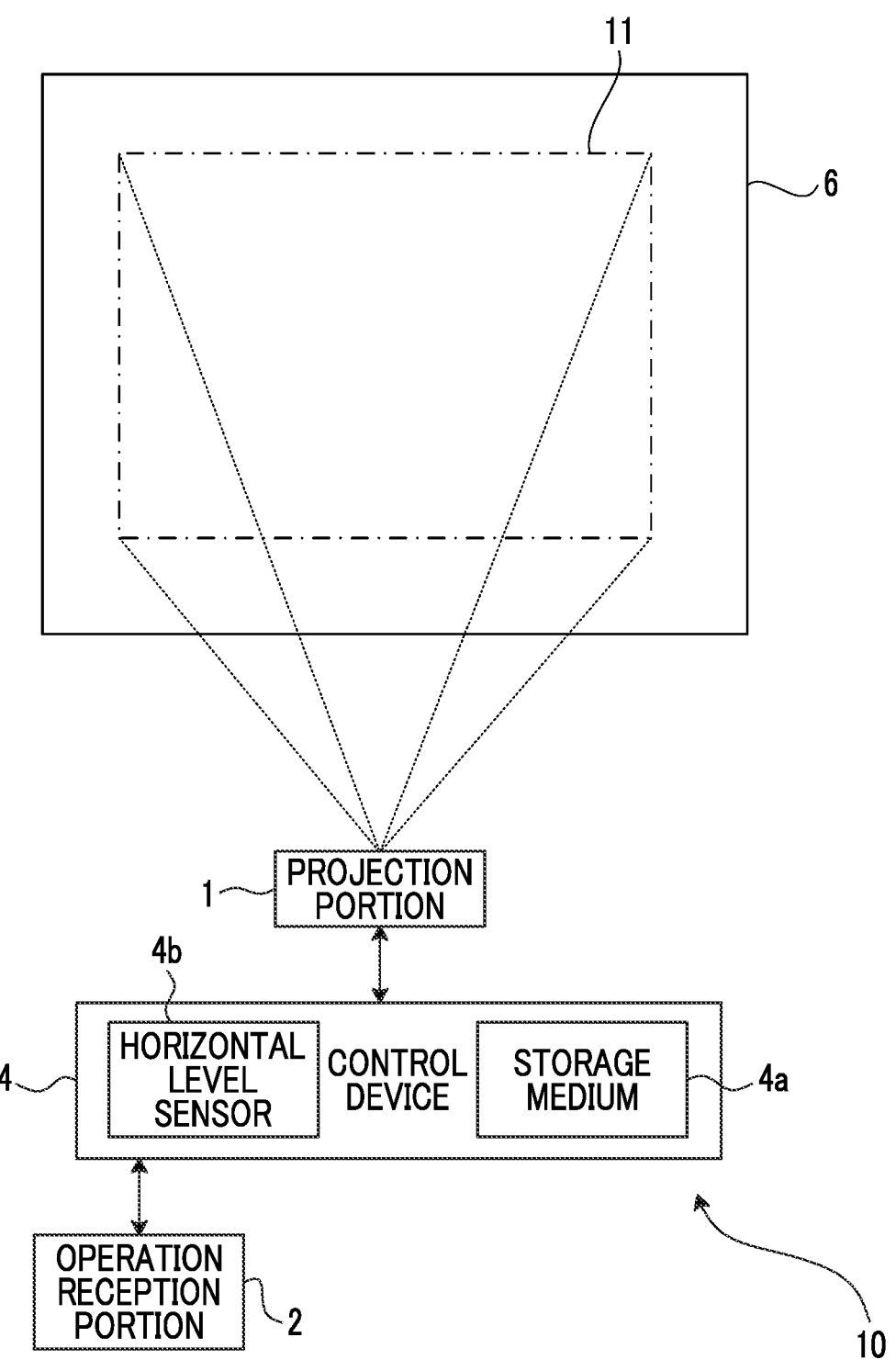
FIG. 1 is a schematic diagram illustrating a schematic configuration of a projection apparatus 10 to which an adjustment support device of an embodiment is applied.

FIG. 1 is a schematic diagram illustrating a schematic configuration of a projection apparatus 10 to which an adjustment support device of the embodiment is applied.

For example, the adjustment support device of the embodiment can be applied to the projection apparatus 10. The projection apparatus 10 comprises a projection portion 1, a control device 4, and an operation reception portion 2. The projection portion 1 is configured with, for example, a liquid crystal projector or a projector using liquid crystal on silicon (LCOS). Hereinafter, the projection portion 1 will be described as a liquid crystal projector.

The control device 4 is a control device that controls projection performed by the projection apparatus 10. The control device 4 is a device including a control portion (controller) configured with various processors, a communication interface (not illustrated) for communicating with each portion, a storage medium 4a such as a hard disk, a solid state drive (SSD), or a read only memory (ROM), and a horizontal level sensor 4b and manages and controls the projection portion 1.

Examples of the various processors of the control portion of the control device 4 include a central processing unit (CPU) that is a general-purpose processor performing various processing by executing a program, a programmable logic device (PLD) such as a field programmable gate array (FPGA) that is a processor having a circuit configuration changeable after manufacturing, or a dedicated electric circuit such as an application specific integrated circuit (ASIC) that is a processor having a circuit configuration dedicatedly designed to execute specific processing.

More specifically, a structure of these various processors is an electric circuit in which circuit elements such as semiconductor elements are combined. The control portion of the control device 4 may be configured with one of the various processors or may be configured with a combination of two or more processors of the same type or different types (for example, a combination of a plurality of FPGAs or a combination of a CPU and an FPGA).

The operation reception portion 2 detects an instruction from a user by receiving various operations from the user. The operation reception portion 2 may be a button, a key, a joystick, or the like provided in the control device 4 or a reception portion or the like that receives a signal from a remote controller for remotely operating the control device 4.

A projection object 6 is an object such as a screen having a projection surface on which a projection image is displayed by the projection portion 1. In the example illustrated in FIG. 1, the projection surface of the projection object 6 is a rectangular plane. It is assumed that upper, lower, left, and right sides of the projection object 6 in FIG. 1 are upper, lower, left, and right sides of the actual projection object 6.

A projection region 11 illustrated by a dot dashed line is a region irradiated with projection light by the projection portion 1 in the projection object 6. In the example illustrated in FIG. 1, the projection region 11 is rectangular. The projection region 11 is a part or the entirety of a projectable range in which the projection can be performed by the projection portion 1.

The horizontal level sensor 4b is an inclination sensor that detects inclination of the projection apparatus 10 with respect to a reference surface. The reference surface is a surface as a reference of inclination of the horizontal level sensor 4b and is, for example, a horizontal surface. For example, the horizontal level sensor 4b can be implemented by a tilt sensor that detects a change in liquid surface in a chamber caused by tilting. However, the horizontal level sensor 4b is not limited thereto and can be implemented by sensors of various types. A detection result of the horizontal level sensor 4b is an example of inclination information indicating the inclination of the projection apparatus 10.

Figure 3:
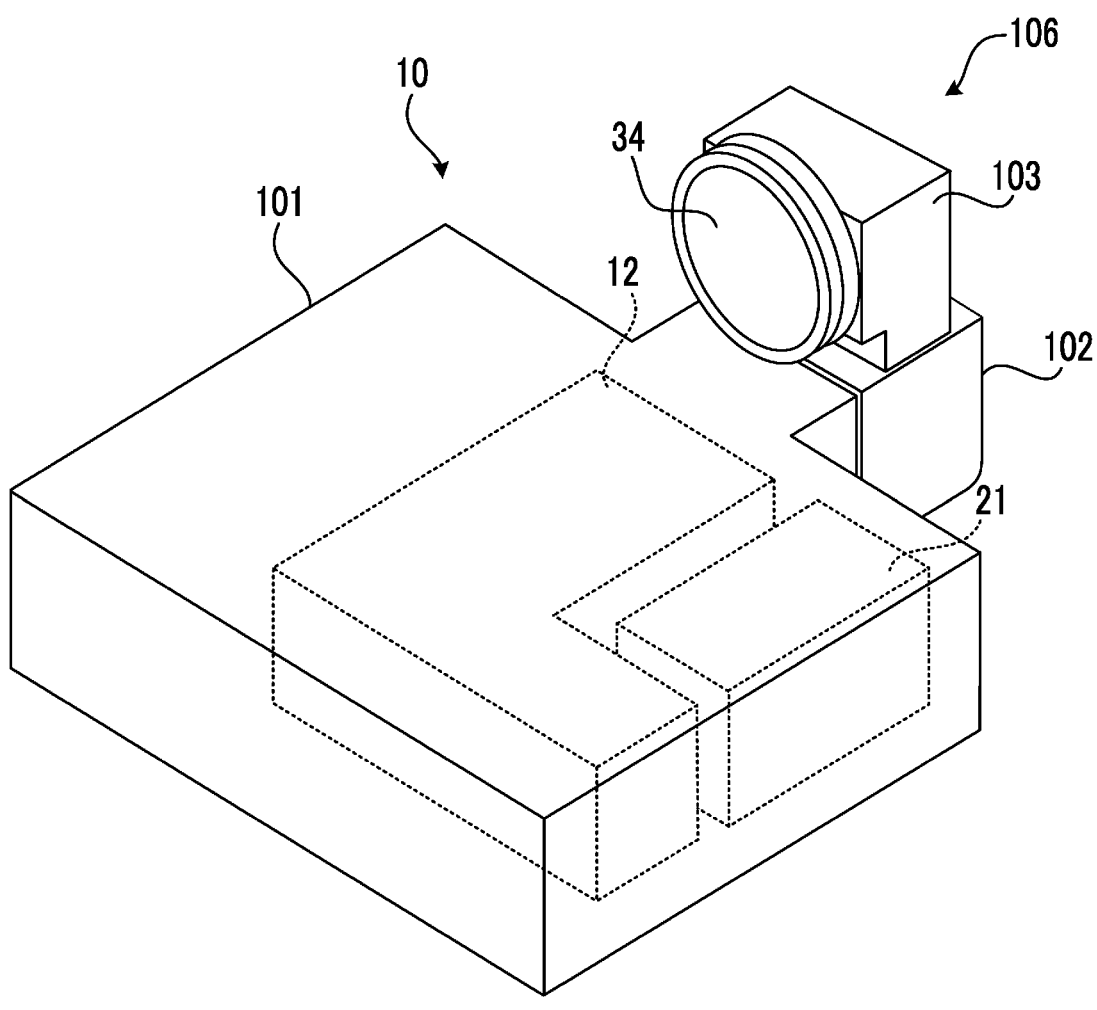
FIG. 3 is a schematic diagram illustrating an exterior configuration of the projection apparatus 10.
Figure 4:
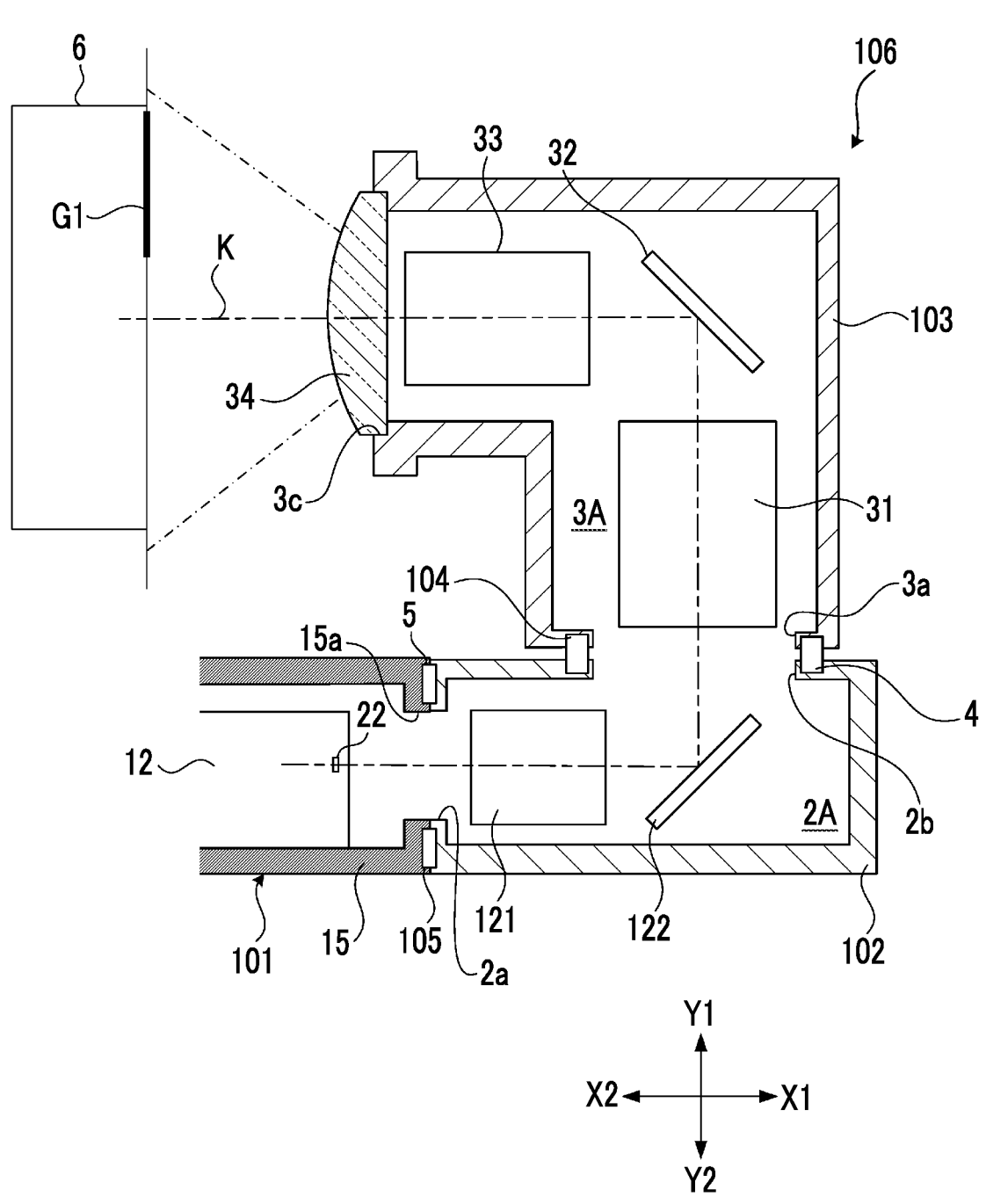
FIG. 4 is a schematic cross-sectional view of an optical unit 106 of the projection apparatus 10 illustrated in FIG. 3.

The projection portion 1, the control device 4, and the operation reception portion 2 are implemented by, for example, one device (for example, refer to FIG. 3 and FIG. 4). Alternatively, the projection portion 1, the control device 4, and the operation reception portion 2 may be separate devices that cooperate by communicating with each other.

<Internal Configuration of Projection Portion 1 Illustrated in FIG. 1>

Figure 2:
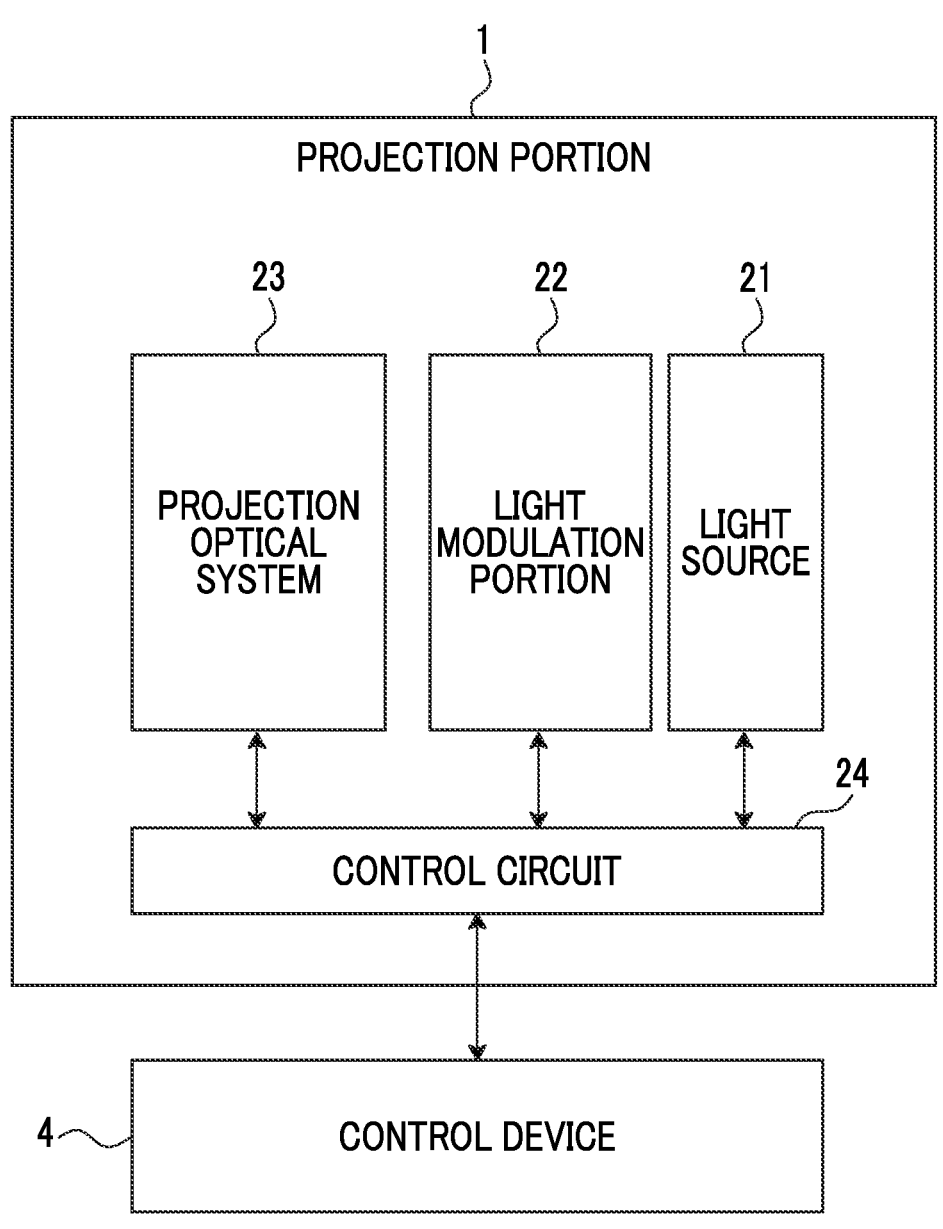
FIG. 2 is a schematic diagram illustrating an example of an internal configuration of a projection portion 1 illustrated in FIG. 1.

FIG. 2 is a schematic diagram illustrating an example of an internal configuration of the projection portion 1 illustrated in FIG. 1.

As illustrated in FIG. 2, the projection portion 1 comprises a light source 21, a light modulation portion 22, a projection optical system 23, and a control circuit 24.

The light source 21 includes a light emitting element such as a laser or a light emitting diode (LED) and emits, for example, white light.

The light modulation portion 22 is configured with three liquid crystal panels that emit each color image by modulating, based on image information, each color light which is emitted from the light source 21 and is separated into three colors of red, blue, and green by a color separation mechanism, not illustrated. Filters of red, blue, and green may be mounted in each of the three liquid crystal panels, and each color image may be emitted by modulating the white light emitted from the light source 21 in each liquid crystal panel.

The light from the light source 21 and the light modulation portion 22 is incident on the projection optical system 23. The projection optical system 23 includes at least one lens and is composed of, for example, a relay optical system. The light that has passed through the projection optical system 23 is projected to the projection object 6.

In the projection object 6, a region irradiated with the light transmitted through the entire range of the light modulation portion 22 is the projectable range in which the projection can be performed by the projection portion 1. In the projectable range, a region irradiated with the light actually transmitted through the light modulation portion 22 is the projection region 11. For example, in the projectable range, a size, a position, and a shape of the projection region 11 are changed by controlling a size, a position, and a shape of a region through which the light is transmitted in the light modulation portion 22.

The control circuit 24 projects an image based on display data to the projection object 6 by controlling the light source 21, the light modulation portion 22, and the projection optical system 23 based on the display data input from the control device 4. The display data input into the control circuit 24 is configured with three constituents of red display data, blue display data, and green display data.

In addition, the control circuit 24 enlarges or reduces the projection region 11 (refer to FIG. 1) of the projection portion 1 by changing the projection optical system 23 based on an instruction input from the control device 4. In addition, the control device 4 may move the projection region 11 of the projection portion 1 by changing the projection optical system 23 based on the operation received by the operation reception portion 2 from the user.

In addition, the projection apparatus 10 comprises a shift mechanism that mechanically or optically moves the projection region 11 while maintaining an image circle of the projection optical system 23. The image circle of the projection optical system 23 is a region in which the projection light incident on the projection optical system 23 appropriately passes through the projection optical system 23 in terms of a light fall-off, color separation, edge part curvature, or the like.

The shift mechanism is implemented by at least any of an optical system shift mechanism that performs optical system shifting, or an electronic shift mechanism that performs electronic shifting.

The optical system shift mechanism is, for example, a mechanism (for example, refer to FIG. 3 and FIG. 4) that moves the projection optical system 23 in a direction perpendicular to an optical axis, or a mechanism that moves the light modulation portion 22 in the direction perpendicular to the optical axis instead of moving the projection optical system 23. In addition, the optical system shift mechanism may perform the movement of the projection optical system 23 and the movement of the light modulation portion 22 in combination.

The electronic shift mechanism is a mechanism that performs pseudo shifting of the projection region 11 by changing a range through which the light is transmitted in the light modulation portion 22.

In addition, the projection apparatus 10 may comprise a projection direction changing mechanism that moves the image circle of the projection optical system 23 and the projection region 11. The projection direction changing mechanism is a mechanism that changes a projection direction of the projection portion 1 by changing a direction of the projection portion 1 by mechanical rotation (for example, refer to FIG. 3 and FIG. 4).

<Mechanical Configuration of Projection Apparatus 10>

FIG. 3 is a schematic diagram illustrating an exterior configuration of the projection apparatus 10. FIG. 4 is a schematic cross-sectional view of an optical unit 106 of the projection apparatus 10 illustrated in FIG. 3. FIG. 4 illustrates a cross section in a plane along an optical path of the light emitted from a body part 101 illustrated in FIG. 3.

As illustrated in FIG. 3, the projection apparatus 10 comprises the body part 101 and the optical unit 106 that is provided to protrude from the body part 101. In the configuration illustrated in FIG. 3, the operation reception portion 2, the control device 4, and the light source 21, the light modulation portion 22, and the control circuit 24 in the projection portion 1 are provided in the body part 101. The projection optical system 23 in the projection portion 1 is provided in the optical unit 106.

The optical unit 106 comprises a first member 102 supported by the body part 101 and a second member 103 supported by the first member 102.

The first member 102 and the second member 103 may be an integrated member. The optical unit 106 may be configured to be attachable to and detachable from the body part 101 (in other words, interchangeably configured).

The body part 101 includes a housing 15 (refer to FIG. 4) in which an opening 15a (refer to FIG. 4) for passing light is formed in a part connected to the optical unit 106.

As illustrated in FIG. 3, the light source 21 and a light modulation unit 12 including the light modulation portion 22 (refer to FIG. 2) that generates an image by spatially modulating the light emitted from the light source 21 based on input image data are provided inside the housing 15 of the body part 101.

The light emitted from the light source 21 is incident on the light modulation portion 22 of the light modulation unit 12 and is spatially modulated and emitted by the light modulation portion 22.

As illustrated in FIG. 4, the image formed by the light spatially modulated by the light modulation unit 12 is incident on the optical unit 106 by passing through the opening 15a of the housing 15 and is projected to the projection object 6 as a projection target object. Accordingly, an image G1 is visible from an observer.

As illustrated in FIG. 4, the optical unit 106 comprises the first member 102 including a hollow portion 2A connected to the inside of the body part 101, the second member 103 including a hollow portion 3A connected to the hollow portion 2A, a first optical system 121 and a reflective member 122 arranged in the hollow portion 2A, a second optical system 31, a reflective member 32, a third optical system 33, and a lens 34 arranged in the hollow portion 3A, a shift mechanism 105, and a projection direction changing mechanism 104.

The first member 102 is a member having, for example, a rectangular cross-sectional exterior shape, in which an opening 2a and an opening 2b are formed in surfaces perpendicular to each other. The first member 102 is supported by the body part 101 in a state where the opening 2a is arranged at a position facing the opening 15a of the body part 101. The light emitted from the light modulation portion 22 of the light modulation unit 12 of the body part 101 is incident into the hollow portion 2A of the first member 102 through the opening 15a and the opening 2a.

An incidence direction of the light incident into the hollow portion 2A from the body part 101 will be referred to as a direction X1. A direction opposite to the direction X1 will be referred to as a direction X2. The direction X1 and the direction X2 will be collectively referred to as a direction X. In addition, in FIG. 4, a direction from the front to the back of the page and an opposite direction will be referred to as a direction Z. In the direction Z, the direction from the front to the back of the page will be referred to as a direction Z1, and the direction from the back to the front of the page will be referred to as a direction Z2.

In addition, a direction perpendicular to the direction X and the direction Z will be referred to as a direction Y. In the direction Y, an upward direction in FIG. 4 will be referred to as a direction Y1, and a downward direction in FIG. 4 will be referred to as a direction Y2. In the example in FIG. 4, the projection apparatus 10 is arranged such that the direction Y2 is a vertical direction.

The projection optical system 23 illustrated in FIG. 2 is composed of the first optical system 121, the reflective member 122, the second optical system 31, the reflective member 32, the third optical system 33, and the lens 34. An optical axis K of the projection optical system 23 is illustrated in FIG. 4. The first optical system 121, the reflective member 122, the second optical system 31, the reflective member 32, the third optical system 33, and the lens 34 are arranged in this order from the light modulation portion 22 side along the optical axis K.

The first optical system 121 includes at least one lens and guides the light that is incident on the first member 102 from the body part 101 and that travels in the direction X1, to the reflective member 122.

The reflective member 122 reflects the light incident from the first optical system 121 in the direction Y1. The reflective member 122 is configured with, for example, a mirror. In the first member 102, the opening 2b is formed on the optical path of the light reflected by the reflective member 122, and the reflected light travels to the hollow portion 3A of the second member 103 by passing through the opening 2b.

The second member 103 is a member having an approximately T-shaped cross-sectional exterior shape, in which an opening 3a is formed at a position facing the opening 2b of the first member 102. The light that has passed through the opening 2b of the first member 102 from the body part 101 is incident into the hollow portion 3A of the second member 103 through the opening 3a. The first member 102 and the second member 103 may have any cross-sectional exterior shape and are not limited to the above.

The second optical system 31 includes at least one lens and guides the light incident from the first member 102 to the reflective member 32.

The reflective member 32 guides the light incident from the second optical system 31 to the third optical system 33 by reflecting the light in the direction X2. The reflective member 32 is configured with, for example, a mirror.

The third optical system 33 includes at least one lens and guides the light reflected by the reflective member 32 to the lens 34.

The lens 34 is arranged in an end part of the second member 103 on the direction X2 side in the form of closing the opening 3c formed in this end part. The lens 34 projects the light incident from the third optical system 33 to the projection object 6.

The projection direction changing mechanism 104 is a rotation mechanism that rotatably connects the second member 103 to the first member 102. By the projection direction changing mechanism 104, the second member 103 is configured to be rotatable about a rotation axis (specifically, the optical axis K) that extends in the direction Y. The projection direction changing mechanism 104 is not limited to an arrangement position illustrated in FIG. 4 as long as the projection direction changing mechanism 104 can rotate the optical system. In addition, the number of rotation mechanisms is not limited to one, and a plurality of rotation mechanisms may be provided.

The shift mechanism 105 is a mechanism for moving the optical axis K of the projection optical system (in other words, the optical unit 106) in a direction (direction Y in FIG. 4) perpendicular to the optical axis K. Specifically, the shift mechanism 105 is configured to be capable of changing a position of the first member 102 in the direction Y with respect to the body part 101. The shift mechanism 105 may manually move the first member 102 or electrically move the first member 102.

FIG. 4 illustrates a state where the first member 102 is moved as far as possible to the direction Y1 side by the shift mechanism 105. By moving the first member 102 in the direction Y2 by the shift mechanism 105 from the state illustrated in FIG. 4, a relative position between a center of the image (in other words, a center of a display surface) formed by the light modulation portion 22 and the optical axis K changes, and the image G1 projected to the projection object 6 can be shifted (translated) in the direction Y2.

The shift mechanism 105 may be a mechanism that moves the light modulation portion 22 in the direction Y instead of moving the optical unit 106 in the direction Y. Even in this case, the image G1 projected to the projection object 6 can be moved in the direction Y2.

<Adjustment Mechanism of Projection Apparatus 10 and Guide Information Output by Projection Apparatus 10>

Figure 5:
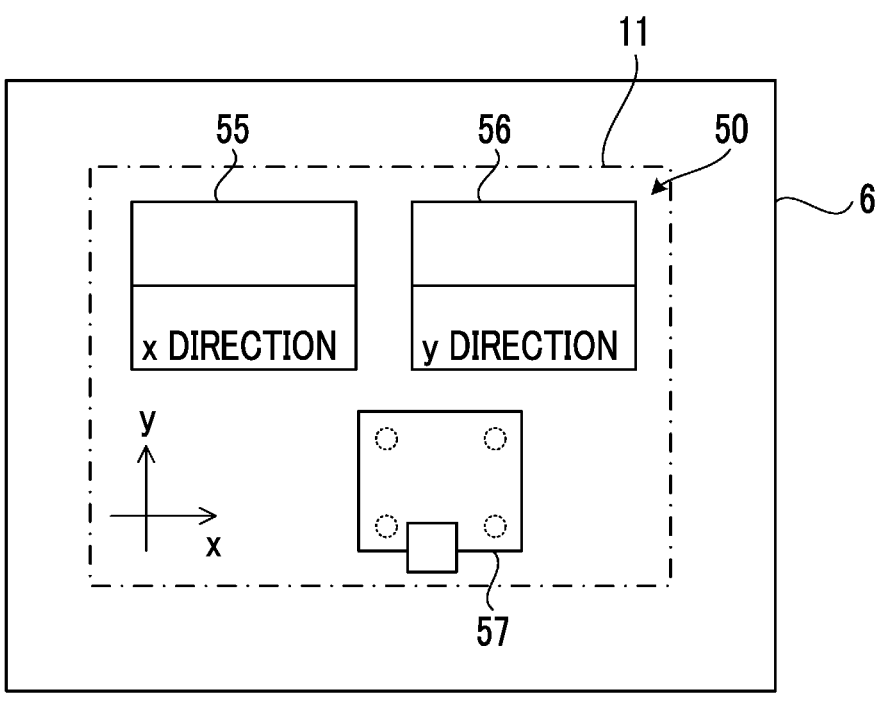
FIG. 5 is a diagram (Part 1) illustrating an example of an adjustment mechanism of the projection apparatus 10 and guide information output by the projection apparatus 10.
Figure 5:
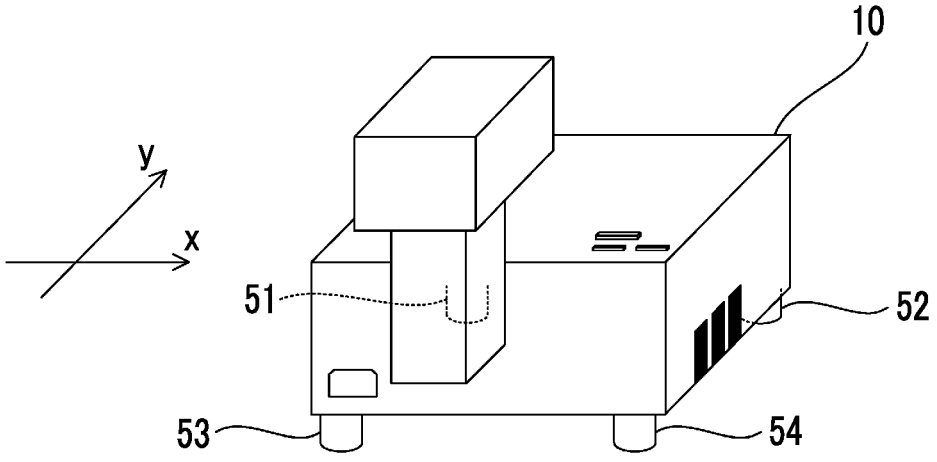
Figure 6:
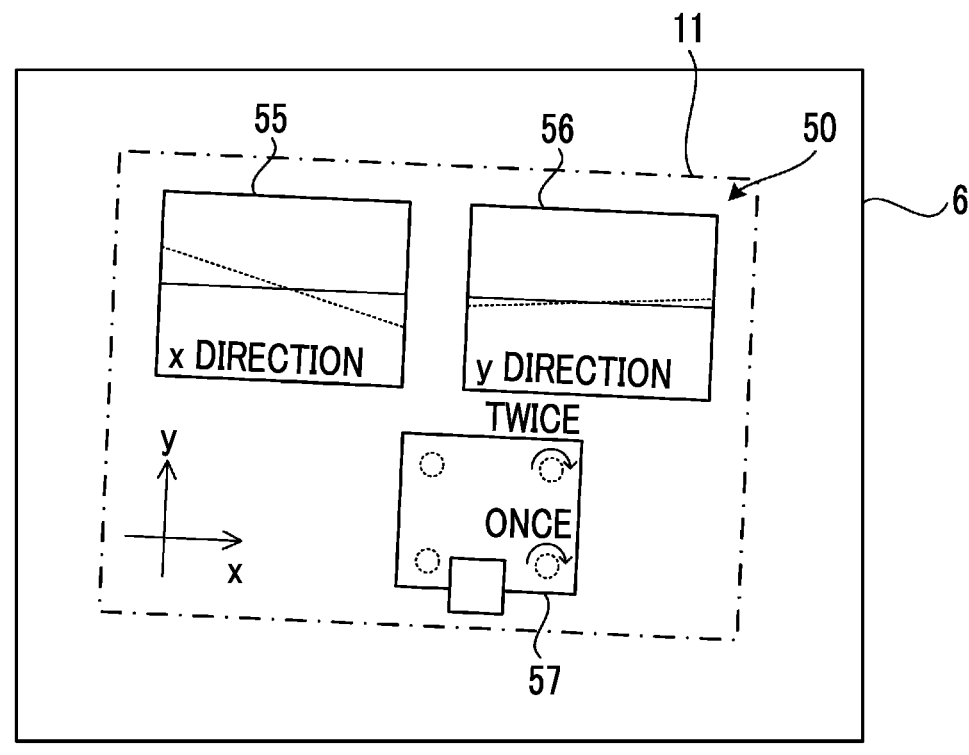
FIG. 6 is a diagram (Part 2) illustrating an example of the adjustment mechanism of the projection apparatus 10 and the guide information output by the projection apparatus 10.
Figure 6:
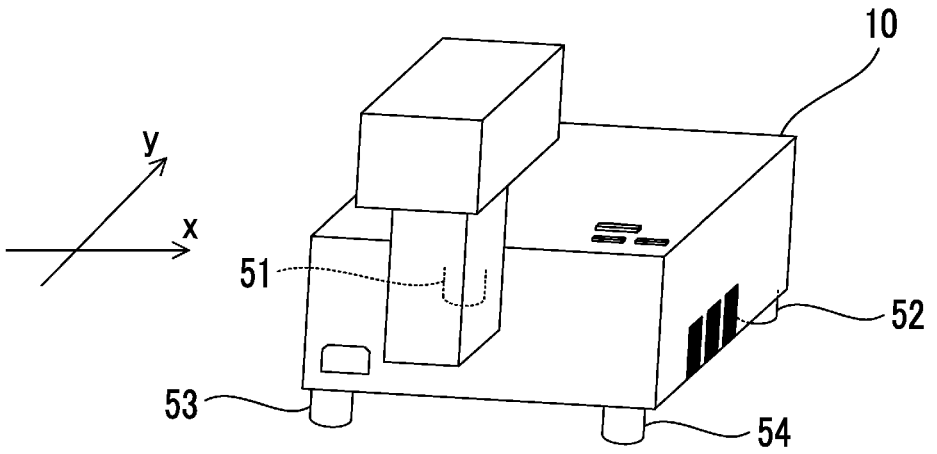

FIG. 5 and FIG. 6 are diagrams illustrating an example of an adjustment mechanism of the projection apparatus 10 and guide information output by the projection apparatus 10. In FIG. 5 and FIG. 6, a direction parallel to the projection object 6 in the reference surface (for example, a horizontal surface) will be referred to as an x direction. A direction orthogonal to the x direction in the reference surface will be referred to as a y direction. FIG. 5 illustrates a state where the projection apparatus 10 is not inclined, and FIG. 6 illustrates a state where the projection apparatus 10 is inclined.

Adjustment legs 51 to 54 of the projection apparatus 10 illustrated in FIG. 5 are an example of the adjustment mechanism provided at four corners on a bottom surface of the projection apparatus 10 for adjusting the inclination of the projection apparatus 10. Specifically, each of the adjustment legs 51 to 54 has a screw portion that can be inserted into a screw hole provided on the bottom surface of the projection apparatus 10.

By rotating each of the adjustment legs 51 to 54 with respect to the bottom surface of the projection apparatus 10 about an axis in a direction orthogonal to the x direction and the y direction, an insertion depth with respect to the screw hole changes, and a height of a part exposed from the bottom surface of the projection apparatus 10 changes. Accordingly, by rotating at least any of the adjustment legs 51 to 54, the inclination of the projection apparatus 10 can be adjusted. Structures of the adjustment legs 51 to 54 will be described later (for example, refer to FIG. 7).

For example, the control device 4 projects an image including the guide information 50 to the projection region 11 from the projection portion 1 based on the detection result of the horizontal level sensor 4b. The guide information 50 includes inclination state information 55 and 56 and operation method information 57.

The inclination state information 55 is an image indicating the detection result of the inclination of the projection apparatus 10 in the x direction by the horizontal level sensor 4b. For example, the inclination state information 55 includes a reference line (solid line) in a lateral direction in the projection image and a straight line (dotted line) indicating the detection result of the inclination of the projection apparatus 10 in the x direction as an angle with respect to the reference line.

The inclination state information 56 is an image indicating the detection result of the inclination of the projection apparatus 10 in the y direction by the horizontal level sensor 4b. For example, the inclination state information 56 includes a reference line (solid line) in the lateral direction in the projection image and a straight line (dotted line) indicating the detection result of the inclination of the projection apparatus 10 in the y direction as an angle with respect to the reference line.

The operation method information 57 indicates an operation method of the adjustment legs 51 to 54 (adjustment mechanism) for adjusting (for example, eliminating) the inclination indicated by the inclination state information 55 and 56. In the examples illustrated in FIG. 5 and FIG. 6, the operation method information 57 is an image diagram illustrating a state of the projection apparatus 10 in a top view. In addition, in the examples illustrated in FIG. 5 and FIG. 6, the guide information 50 also includes an x axis and a y axis indicating the x direction and the y direction in the image diagram of the operation method information 57.

For example, in the example illustrated in FIG. 6, the operation method information 57 indicates that in order to adjust the inclination of the projection apparatus 10, the adjustment leg 52 is to be rotated twice rightward in the top view, and that the adjustment leg 54 is to be rotated once rightward in the top view. That is, as the operation method for adjusting the inclination of the projection apparatus 10, the control device 4 projects the guide information 50 including the operation method information 57 indicating a rotation method of at least any of the adjustment legs 51 to 54 using the projection portion 1. This rotation method includes an adjustment leg of a rotation target among the adjustment legs 51 to 54 and a rotation method and a rotation amount of the adjustment leg of the rotation target.

For example, the control device 4 stores correspondence information indicating a relationship between operations of the adjustment legs 51 to 54 and a change in the inclination of the projection apparatus 10 and generates the guide information 50 indicating the operation method of the adjustment legs 51 to 54 for adjusting the inclination of the projection apparatus 10 based on the correspondence information and the detection result of the horizontal level sensor 4*b*.

The projection apparatus 10 generates the guide information 50 indicating the operation method of the adjustment legs 51 to 54 (adjustment mechanism) for adjusting the inclination of the projection apparatus 10 based on the detection result (inclination information) of the horizontal level sensor 4*b* indicating the inclination of the projection apparatus 10 with respect to the reference surface, and outputs the generated guide information 50 to the user by performing projection using the projection apparatus 10.

Accordingly, for example, the user can directly understand the operation method of the adjustment legs 51 to 54 (adjustment mechanism) for adjusting the inclination of the projection apparatus 10, compared to a case of outputting only the inclination state information 55 and 56. Thus, inclination adjustment of the projection apparatus 10 can be facilitated. For example, even in a case where the user does not know how to read the inclination state information 55 and 56 or does not perceive the relationship between the operations of the adjustment legs 51 to 54 and a change in the inclination of the projection apparatus 10, the user can easily adjust the inclination of the projection apparatus 10.

In addition, for example, in the example illustrated in FIG. 6, after projecting the guide information 50 from the projection portion 1, the control device 4 may update the guide information 50 in accordance with a change in the inclination of the projection apparatus 10 and project the updated guide information 50 from the projection portion 1.

For example, in a case where the user rotates the adjustment leg 52 once rightward from the state illustrated in FIG. 6, the control device 4 may derive the operation method of the adjustment legs 51 to 54 for adjusting the inclination of the projection apparatus 10 again based on a change in the detection result of the horizontal level sensor 4*b*, and project the new guide information 50 indicating the derived operation method from the projection portion 1. For example, the operation method information 57 in the new guide information 50 indicates that in order to adjust the inclination of the projection apparatus 10, the adjustment leg 52 is to be rotated once rightward in the top view, and that the adjustment leg 54 is to be rotated once rightward in the top view. Accordingly, the guide information 50 can be updated in accordance with the operations of the adjustment legs 51 to 54 performed by the user, and the user can easily perceive a remaining necessary operation.

In addition, in a case where the inclination of the projection apparatus 10 is sufficiently decreased based on the detection result of the horizontal level sensor 4*b*, the control device 4 may notify the user that the projection apparatus 10 is horizontal. Various notification methods such as projection to the projection object 6, voice output using a speaker, and screen output using a display can be used for the notification.

A change in the detection result of the horizontal level sensor 4*b* may change in detail because of vibration and the like of the projection apparatus 10 caused by the operations of the adjustment legs 51 to 54 performed by the user or other factors, and it may be appropriate not to reflect such a detailed change on the guide information 50.

Therefore, the control device 4 may update the guide information 50 in a case where an amount of change in the inclination of the projection apparatus 10 per hour is greater than or equal to a predetermined amount of change, and may not update the guide information 50 in a case where the amount of change in the inclination of the projection apparatus 10 per hour is less than the predetermined amount of change. Accordingly, variation in the update of the guide information 50 caused by vibration and the like of the projection apparatus 10 can be suppressed.

In addition, after the adjustment of the inclination of the projection apparatus 10 using the adjustment legs 51 to 54 (adjustment mechanism), the projection apparatus 10 may adjust inclination of the projection region 11 by processing the projection image to be projected from the projection portion 1.

For example, in a case where there is slight inclination of the projection apparatus 10 based on the detection result of the horizontal level sensor 4*b* after the adjustment of the inclination of the projection apparatus 10 using the adjustment legs 51 to 54 (adjustment mechanism), the control device 4 adjusts the inclination of the projection region 11 by slightly inclining the projection image in the light modulation portion 22. Accordingly, even slight inclination of the projection region 11 that is not completely adjusted by the operations of the adjustment legs 51 to 54 performed by the user can be adjusted. In addition, in this case, the control device 4 may project information indicating a state of the projection region 11 before being adjusted by processing the projection image to the projection object 6 from the projection portion 1 (for example, refer to FIG. 14).

\<Structures of Adjustment Legs 51 to 54\>

Figure 7:
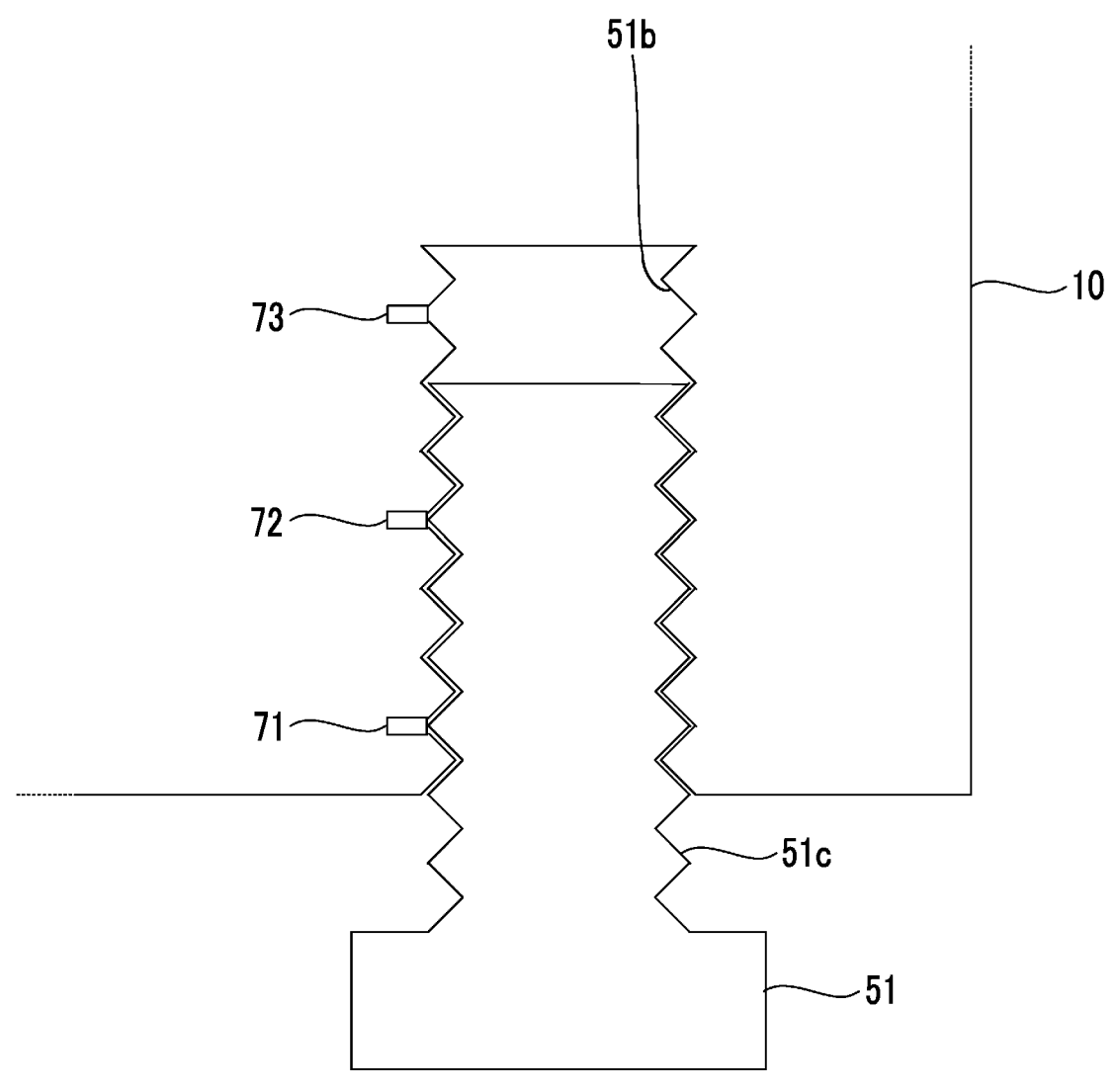
FIG. 7 is a diagram illustrating an example of structures of adjustment legs 51 to 54.

FIG. 7 is a diagram illustrating an example of the structures of the adjustment legs 51 to 54. While the structure of the adjustment leg 51 will be described, the same applies to the structures of the adjustment legs 52 to 54. As illustrated in FIG. 7, a screw hole 51*b* is provided on the bottom surface of the projection apparatus 10, and the adjustment leg 51 has a screw portion 51*c* that can be inserted into the screw hole 51*b*.

For example, in a case where the adjustment leg 51 is rotated rightward in a view facing the bottom surface of the projection apparatus 10 (that is, rotated leftward in the top view of the projection apparatus 10), the screw portion 51*c* enters to an end of the screw hole 51*b*. Accordingly, the height of the part exposed from the bottom surface of the projection apparatus 10 in the adjustment leg 51 is decreased, and a part in which the screw portion 51*c* is provided in the projection apparatus 10 is lowered.

In addition, in a case where the adjustment leg 51 is rotated leftward in a view facing the bottom surface of the projection apparatus 10 (that is, rotated rightward in the top view of the projection apparatus 10), the screw portion 51*c* is pulled out from the end of the screw hole 51*b*. Accordingly, the height of the part exposed from the bottom surface of the projection apparatus 10 in the adjustment leg 51 is increased, and the part in which the screw portion 51*c* is provided in the projection apparatus 10 is raised.

As illustrated in FIG. 7, optical sensors 71 to 73 may be provided in the screw hole 51b. The optical sensors 71 to 73 are provided at different positions in a height direction in the screw hole 51b.

The optical sensor 71 detects whether or not the adjustment leg 51 is present at a height at which the optical sensor 71 is provided in the screw hole 51b. For example, the optical sensor 71 detects whether or not the adjustment leg 51 is present by emitting an infrared ray or the like toward the inside of the screw hole 51b and detecting reflected light. In the same manner as the optical sensor 71, the optical sensors 72 and 73 also detect whether or not the adjustment leg 51 is present at heights at which the optical sensors 72 and 73 are respectively provided in the screw hole 51b.

The control device 4 may acquire information indicating the insertion depth of the adjustment leg 51 with respect to the screw hole 51b based on detection results of the optical sensors 71 to 73. The same sensors as the optical sensors 71 to 73 are provided in not only the screw hole 51b corresponding to the adjustment leg 51 but also screw holes corresponding to the adjustment legs 52 to 54, respectively. In this case, the control device 4 derives the operation method of the adjustment legs 51 to 54 for adjusting the inclination of the projection apparatus 10 based on the acquired information, and generates the guide information 50 indicating the derived operation method.

Specifically, the control device 4 generates the guide information 50 indicating the operation method of the adjustment legs 51 to 54 based on states of the adjustment legs 51 to 54 depending on the detection results of the optical sensors 71 to 73, and on limits of the operations of the adjustment legs 51 to 54.

For example, the adjustment leg 51 has a rightward rotation limit and a leftward rotation limit. The rightward rotation limit of the adjustment leg 51 is a state where the adjustment leg 51 is inserted to the deepest end of the screw hole 51b, and is a state where further rightward rotation of the adjustment leg 51 is not possible. The leftward rotation limit of the adjustment leg 51 is a state where only a tip end of the adjustment leg 51 is inserted into the screw hole 51b, and is a state where further rotating the adjustment leg 51 leftward causes the adjustment leg 51 to fall from the screw hole 51b. The adjustment legs 52 to 54 also have rightward rotation limits and leftward rotation limits like the adjustment leg 51.

The control device 4 derives a rotatable range of the adjustment leg 51 based on the detection results of the optical sensors 71 to 73 and the rightward rotation limit and the leftward rotation limit of the adjustment leg 51. In addition, the control device 4 also derives rotatable ranges for the adjustment legs 52 to 54 in the same manner as for the adjustment leg 51. The control device 4 derives the operation method of the adjustment legs 51 to 54 for adjusting the inclination of the projection apparatus 10 within the derived rotatable ranges of the adjustment legs 51 to 54 based on the detection result of the horizontal level sensor 4b.

The control device 4 may generate the guide information 50 based on information (for example, the detection results of the optical sensors 71 to 73) indicating the states of the adjustment legs 51 to 54 (adjustment mechanism). In addition, the control device 4 may generate the guide information 50 based on information indicating the limits of the operations of the adjustment legs 51 to 54 (adjustment mechanism).

While a configuration of providing three optical sensors (optical sensors 71 to 73) in the screw hole 51b has been described in FIG. 7, any number of optical sensors can be set. In addition, while a configuration of providing the optical sensors 71 to 73 for obtaining the information indicating the states of the adjustment legs 51 to 54 (adjustment mechanism) has been described, the sensors for obtaining the information indicating the states of the adjustment legs 51 to 54 (adjustment mechanism) are not limited thereto and can be sensors of various types.

<Guide Information Including Information for Aligning Position Between Projection Apparatuses>

Figure 8:
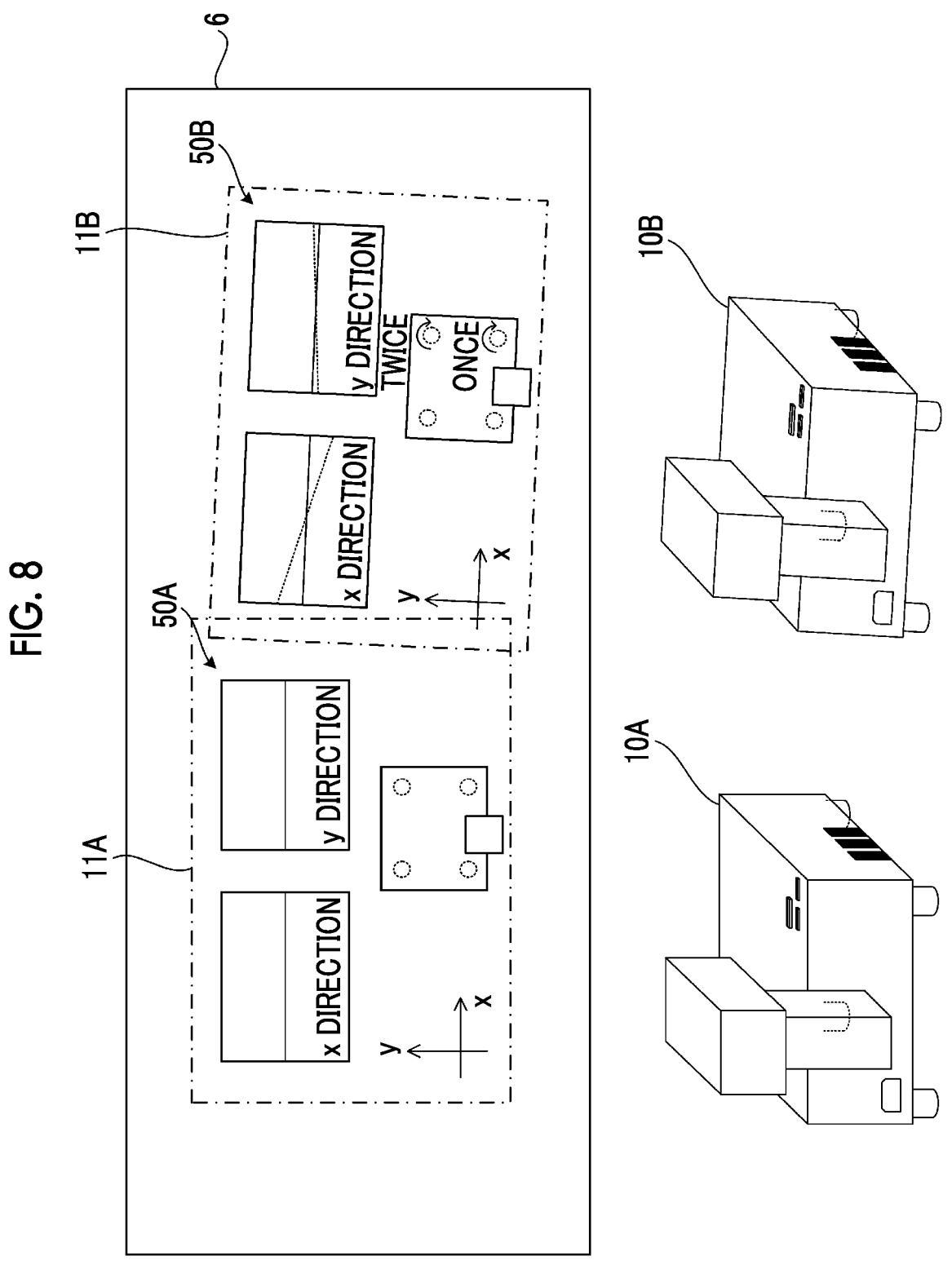
FIG. 8 is a diagram (Part 1) illustrating an example of guide information 50 including information for aligning a position of a projection region between projection apparatuses.
Figure 9:
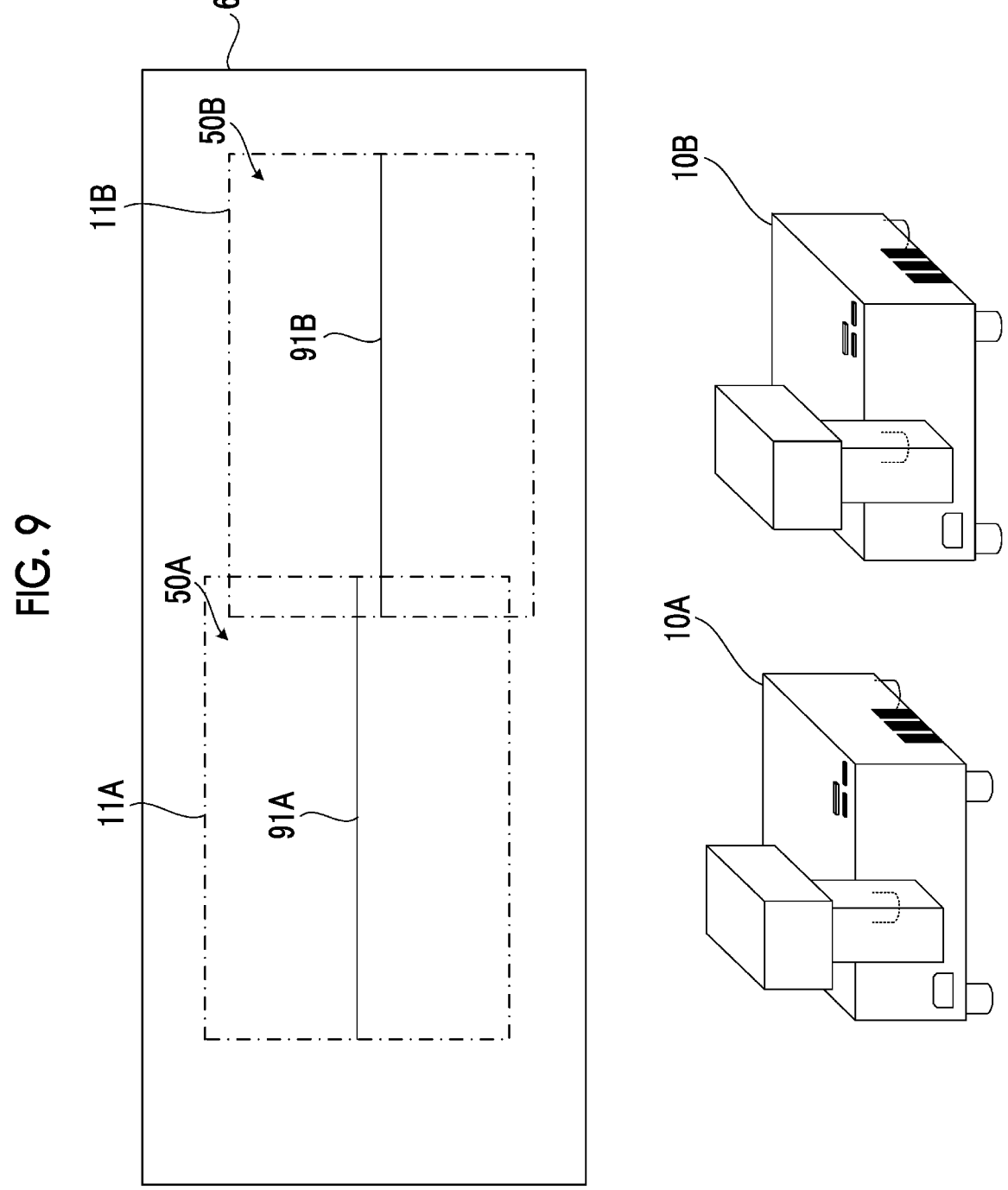
FIG. 9 is a diagram (Part 2) illustrating an example of the guide information 50 including the information for aligning the position of the projection region between the projection apparatuses.
Figure 10:
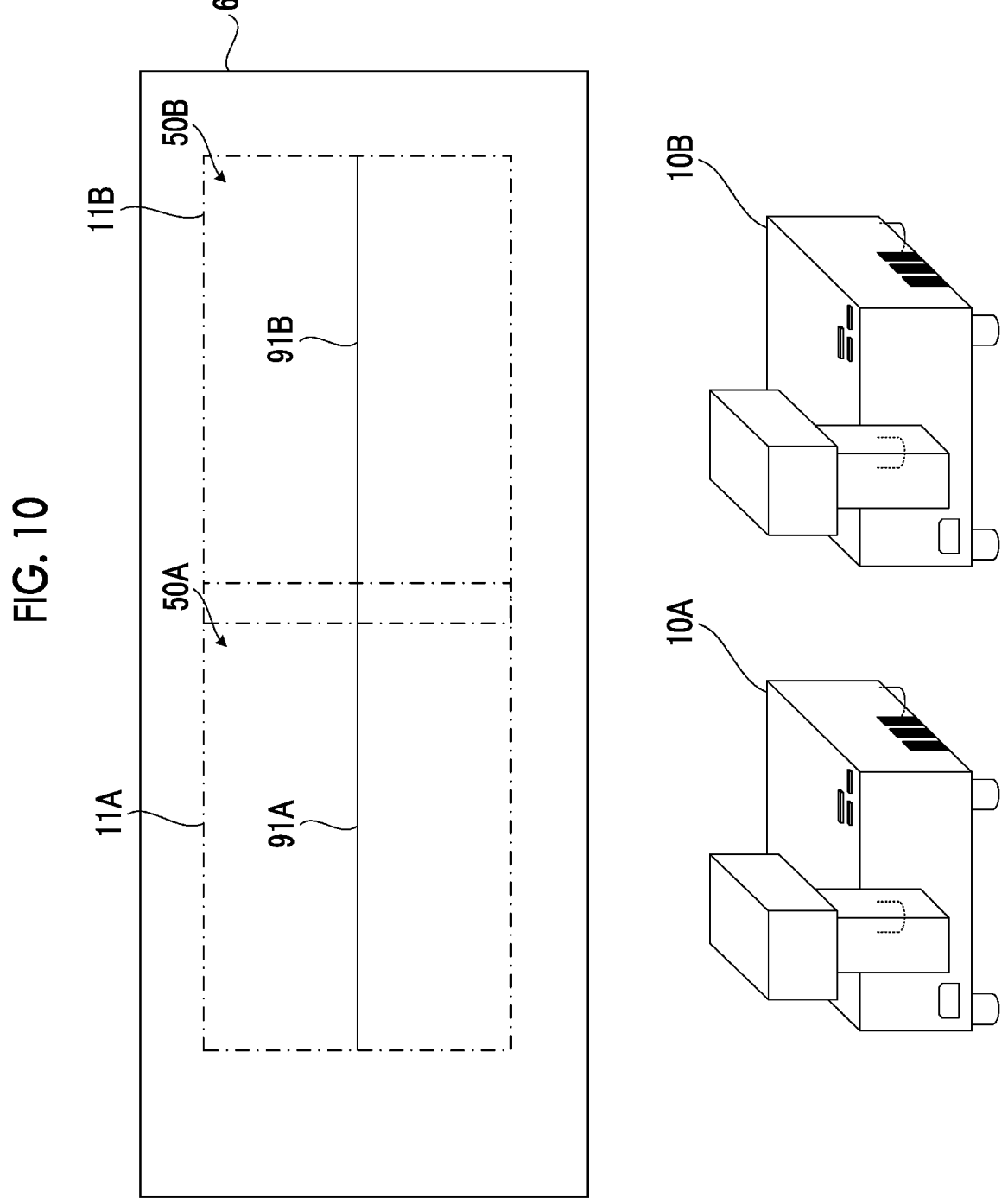
FIG. 10 is a diagram (Part 3) illustrating an example of the guide information 50 including the information for aligning the position of the projection region between the projection apparatuses.

FIG. 8 to FIG. 10 are diagrams illustrating an example of the guide information 50 including information for aligning the position of the projection region between projection apparatuses. Each of projection apparatuses 10A and 10B illustrated in FIG. 8 to FIG. 10 is the same apparatus as the projection apparatus 10. Projection regions 11A and 11B are projection regions of the projection apparatuses 10A and 10B, respectively. Guide information 50A and 50B are guide information of the projection apparatuses 10A and 10B, respectively.

As illustrated in FIG. 8, the projection apparatuses 10A and 10B project the guide information 50A and 50B to the projection regions 11A and 11B, respectively, and prompt the user to adjust inclination. In the example illustrated in FIG. 8, the projection apparatus 10A is in a state (the same state as FIG. 5) where there is no inclination with respect to the reference surface, and the projection apparatus 10B is in a state (the same state as FIG. 6) where there is inclination with respect to the reference surface.

Regarding this point, the user adjusts inclination of the projection apparatuses 10A and 10B in accordance with the guide information 50A and 50B. An adjustment method of the inclination of the projection apparatuses 10A and 10B is the same as the above adjustment method of the inclination of the projection apparatus 10. In the example in FIG. 8, the user adjusts the inclination of only the projection apparatus 10B that is inclined.

In a case where the inclination of the projection apparatus 10A is eliminated, the projection apparatus 10A projects the guide information 50A including a positional reference line 91A to the projection region 11A as illustrated in FIG. 9. Similarly, in a case where the inclination of the projection apparatus 10B is eliminated, the projection apparatus 10B projects the guide information 50B including a positional reference line 91B to the projection region 11B as illustrated in FIG. 9. Each of the projection apparatuses 10A and 10B detects the elimination of inclination in accordance with, for example, the detection result of the horizontal level sensor or an operation from the user.

The reference lines 91A and 91B are information for aligning a position (height) of the projection region 11A of the projection apparatus 10A with a position (height) of the projection region 11B of the projection apparatus 10B. In the example illustrated in FIG. 8, the reference lines 91A and 91B are lateral lines indicating a reference position (for example, a center) in the height direction in the projection regions 11A and 11B, respectively.

In addition, in the state illustrated in FIG. 9, the control device 4 may include a message such as "Please align heights by shifting" prompting the alignment of the heights of the projection regions 11A and 11B in the guide information 50A and 50B or output the message by voice.

Regarding this point, the user adjusts relative heights of the projection regions 11A and 11B in accordance with the reference lines 91A and 91B. For example, the adjustment of the height of the projection region 11A can be performed using the optical system shift mechanism or the electronic shift mechanism in the direction Y. Alternatively, the adjustment of the height of the projection region 11A may be performed by rotating all of the adjustment legs 51 to 54 comprised in the projection apparatus 10A in the same direction by the same amount, or may be performed using a height adjustment mechanism different from the adjustment legs 51 to 54. The adjustment of the height of the projection region 11B is the same as the adjustment of the height of the projection region 11A.

For example, as illustrated in FIG. 10, the user aligns the height of the projection region 11A with the height of the projection region 11B by performing an operation of raising the projection region 11B so that heights of the reference lines 91A and 91B match. This can result in a state where inclination of each of the projection regions 11A and 11B is adjusted and the height of the projection region 11A is aligned.

A case of aligning the heights of the projection regions 11A and 11B that are laterally arranged has been described. However, for example, in a case where the projection regions 11A and 11B are vertically arranged, positions of the projection regions 11A and 11B in the lateral direction may be aligned. In this case, the reference lines 91A and 91B are vertical lines indicating a reference position (for example, a center) in the lateral direction (horizontal direction) in the projection regions 11A and 11B, respectively.

<End Point Fixing Mode of Control Device 4>

Figure 11:
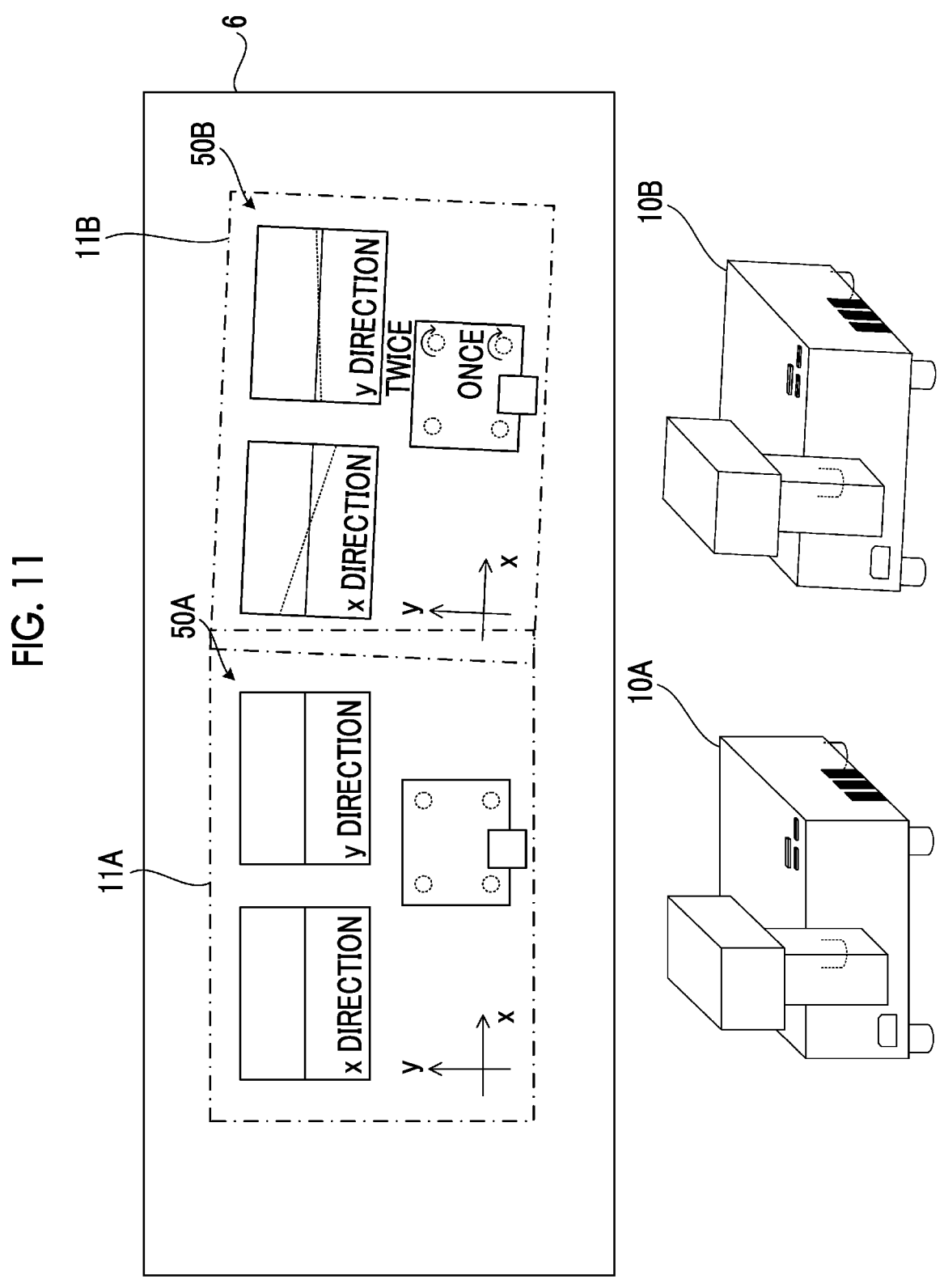
FIG. 11 is a diagram (Part 1) illustrating an example of an end point fixing mode of a control device 4.
Figure 12:
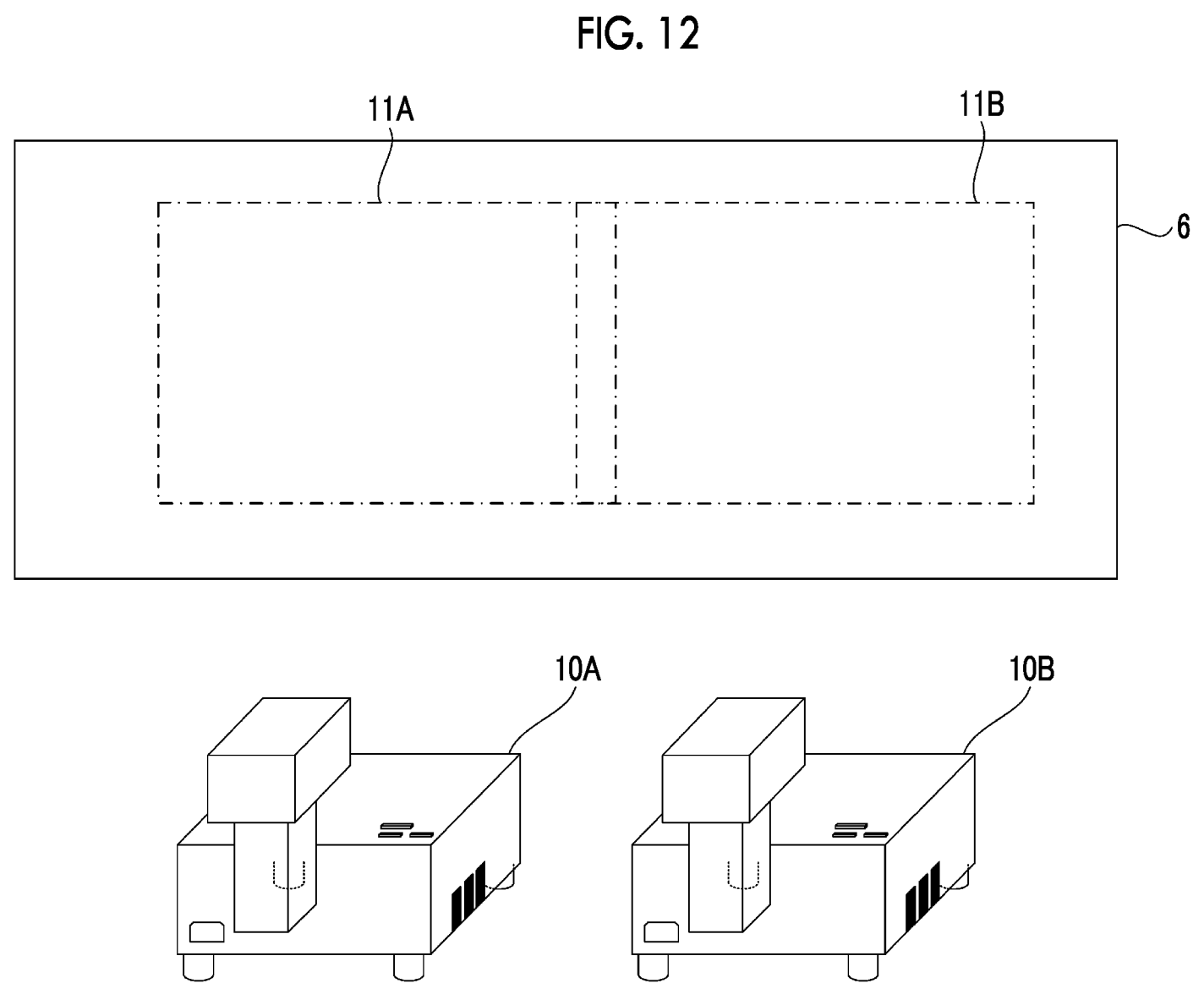

FIG. 11 and FIG. 12 are diagrams illustrating an example of an end point fixing mode of the control device 4. In the control device 4, for example, the end point fixing mode may be settable in accordance with an operation from the user. For example, as illustrated in FIG. 11, in a case where a height of an left end of the projection region 11B matches the projection region 11A, the user operates the control device 4 of the projection apparatus 10B to set the end point fixing mode in which the left end of the projection region 11B is fixed.

In this case, the control device 4 of the projection apparatus 10B derives the operation method of the adjustment legs 51 to 54 of the projection apparatus 10B for adjusting the inclination of the projection apparatus 10B to an extent in which a height of a left end of the projection apparatus 10B is not changed. Specifically, the control device 4 of the projection apparatus 10B derives a rotation method of rotating at least any of the adjustment leg 52 or 54 on a right side without rotating the adjustment legs 51 and 53 on a left side in order to adjust the inclination of the projection apparatus 10B.

The control device 4 of the projection apparatus 10B projects the guide information 50B including the operation method information 57 indicating the derived rotation method from the projection portion 1 of the projection apparatus 10B. Regarding this point, the user can adjust the inclination of the projection apparatus 10B by adjusting at least any of the adjustment leg 52 or 54 in accordance with the guide information 50B.

In this case, as illustrated in FIG. 12, the heights of the projection regions 11A and 11B match at a point in time when the inclination of the projection apparatus 10B is adjusted. Thus, the control device 4 of the projection apparatus 10B may not project the reference line 91B as illustrated in FIGS. 9 and 10 from the projection portion 1 of the projection apparatus 10B.

<Guide Information 50 Including Information Indicating Shift Limits of Projection Regions 11A and 11B>

Figure 13:
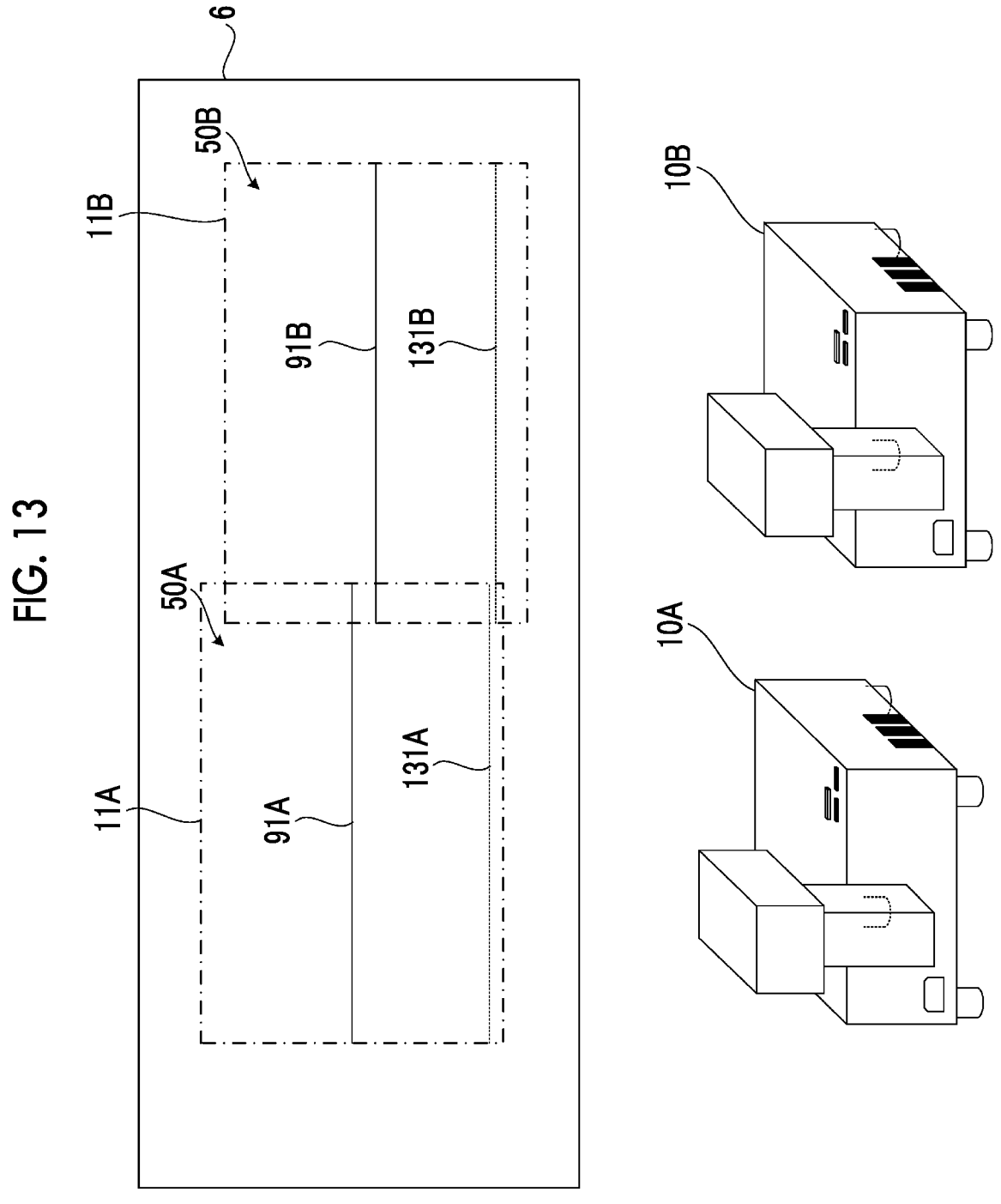
FIG. 13 is a diagram illustrating an example of the guide information 50 including information indicating shift limits of projection regions 11A and 11B.

FIG. 13 is a diagram illustrating an example of the guide information 50 including information indicating shift limits of the projection regions 11A and 11B. In the state illustrated in FIG. 9, the projection apparatuses 10A and 10B may project the guide information 50A and 50B including shift limit lines 131A and 131B, respectively, as illustrated in FIG. 13.

The shift limit line 131A is information indicating a limit of shifting of the projection region 11A in an upward direction that can be performed using the optical system shift mechanism or the electronic shift mechanism in the direction Y. That is, in the projection apparatus 10A, the projection region 11A can be shifted in the upward direction until a lower side of the projection region 11A reaches a position of the shift limit line 131A. The position of the shift limit line 131A in the projection object 6 does not move even in a case where the projection region 11A is shifted. This can be implemented by changing the position of the shift limit line 131A in the projection image by the control device 4 of the projection apparatus 10A in accordance with the shifting of the projection region 11A.

The shift limit line 131B is information indicating a limit of shifting of the projection region 11B in the upward direction that can be performed using the optical system shift mechanism or the electronic shift mechanism in the direction Y. That is, in the projection apparatus 10B, the projection region 11B can be shifted in the upward direction until a lower side of the projection region 11B reaches a position of the shift limit line 131B. The position of the shift limit line 131B in the projection object 6 does not move even in a case where the projection region 11B is shifted. This can be implemented by changing the position of the shift limit line 131B in the projection image by the control device 4 of the projection apparatus 10B in accordance with the shifting of the projection region 11B.

The projection apparatuses 10A and 10B can shift the projection regions 11A and 11B, respectively, and the guide information 50A and 50B may include information indicating the limits of the shifting. Accordingly, the user can align the positions of the projection regions 11A and 11B by shifting at least any of the projection region 11A or 11B based on the information indicating the limits of the shifting.

While the shift limit lines 131A and 131B indicating the limits of the shifting of the projection regions 11A and 11B in the upward direction have been described in FIG. 13, the present invention is not limited thereto. For example, shift limit lines indicating limits of shifting of the projection regions 11A and 11B in a downward direction may be included in the guide information 50A and 50B.

<State of Projection Region of Projection Apparatus 10 Before being Adjusted by Processing Projection Image>

Figure 14:
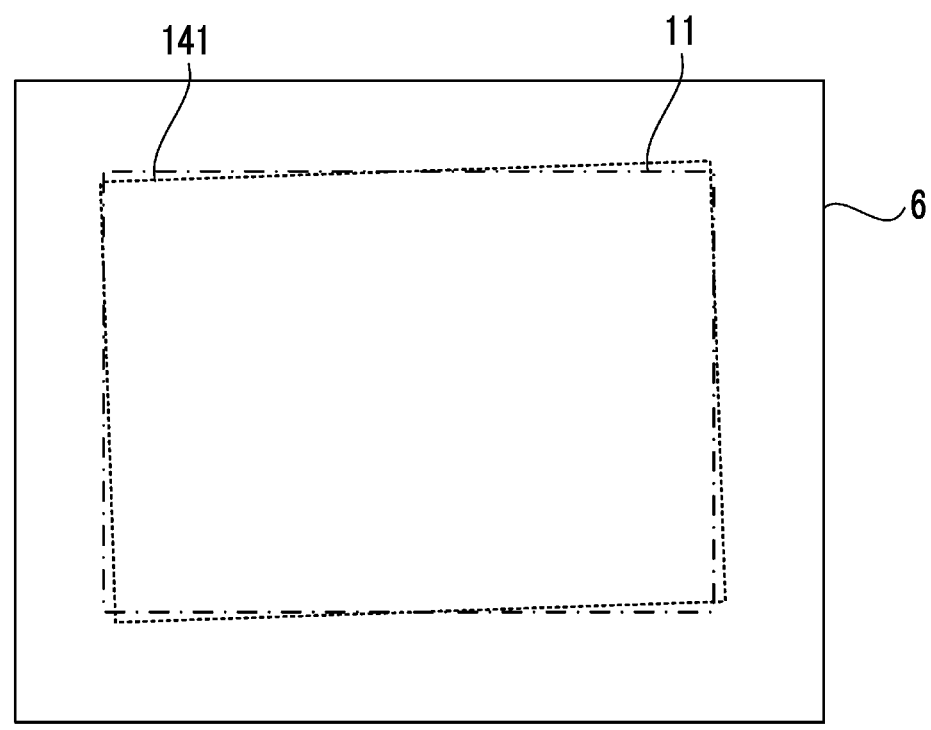
FIG. 14 is a diagram illustrating an example of information indicating a state of the projection region of the projection apparatus 10 before being adjusted by processing a projection image.
Figure 14:
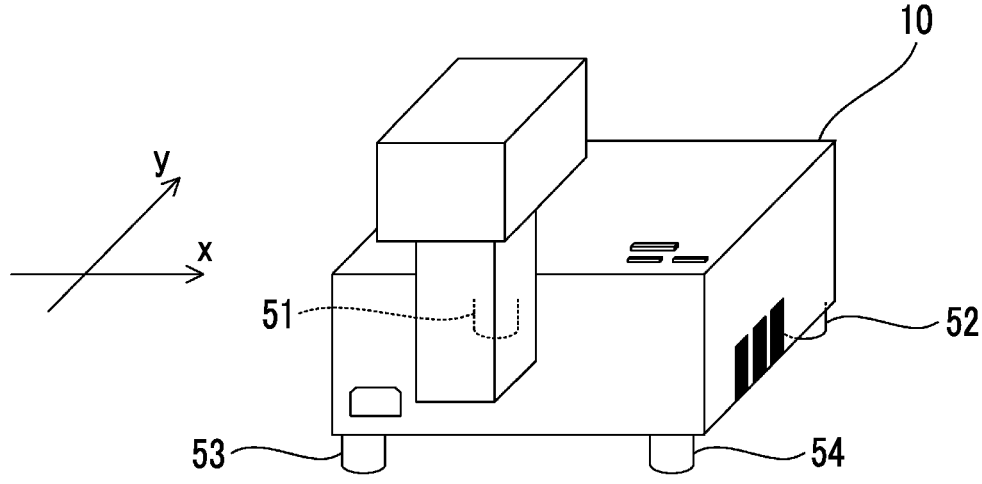

FIG. 14 is a diagram illustrating an example of information indicating a state of the projection region of the projection apparatus 10 before being adjusted by processing the projection image. In a case where the inclination of the projection region 11 is adjusted by processing the projection image to be projected from the projection portion 1 after the adjustment of the inclination of the projection apparatus 10 using the adjustment legs 51 to 54, the projection apparatus 10 may project the information indicating the state of the projection region 11 before being adjusted by processing the projection image to the projection object 6.

For example, the control device 4 may project a frame line 141 to the projection object 6 as illustrated in FIG. 14 after the inclination of the projection region 11 is adjusted by processing the projection image projected from the projection portion 1. The frame line 141 indicates the projection region 11 before the adjustment of the inclination of the projection region 11 by processing the projection image after the adjustment of the inclination of the projection apparatus 10 using the adjustment legs 51 to 54 (adjustment mechanism).

Accordingly, the user can perceive how the inclination of the projection region 11 is adjusted by processing the projection image projected from the projection portion 1. In addition, even in a case where the inclination of the projection region 11 is adjusted by processing the projection image projected from the projection portion 1, the user can perceive the actual inclination of the projection apparatus 10.

<Processing Performed by Control Device 4>

Figure 15:
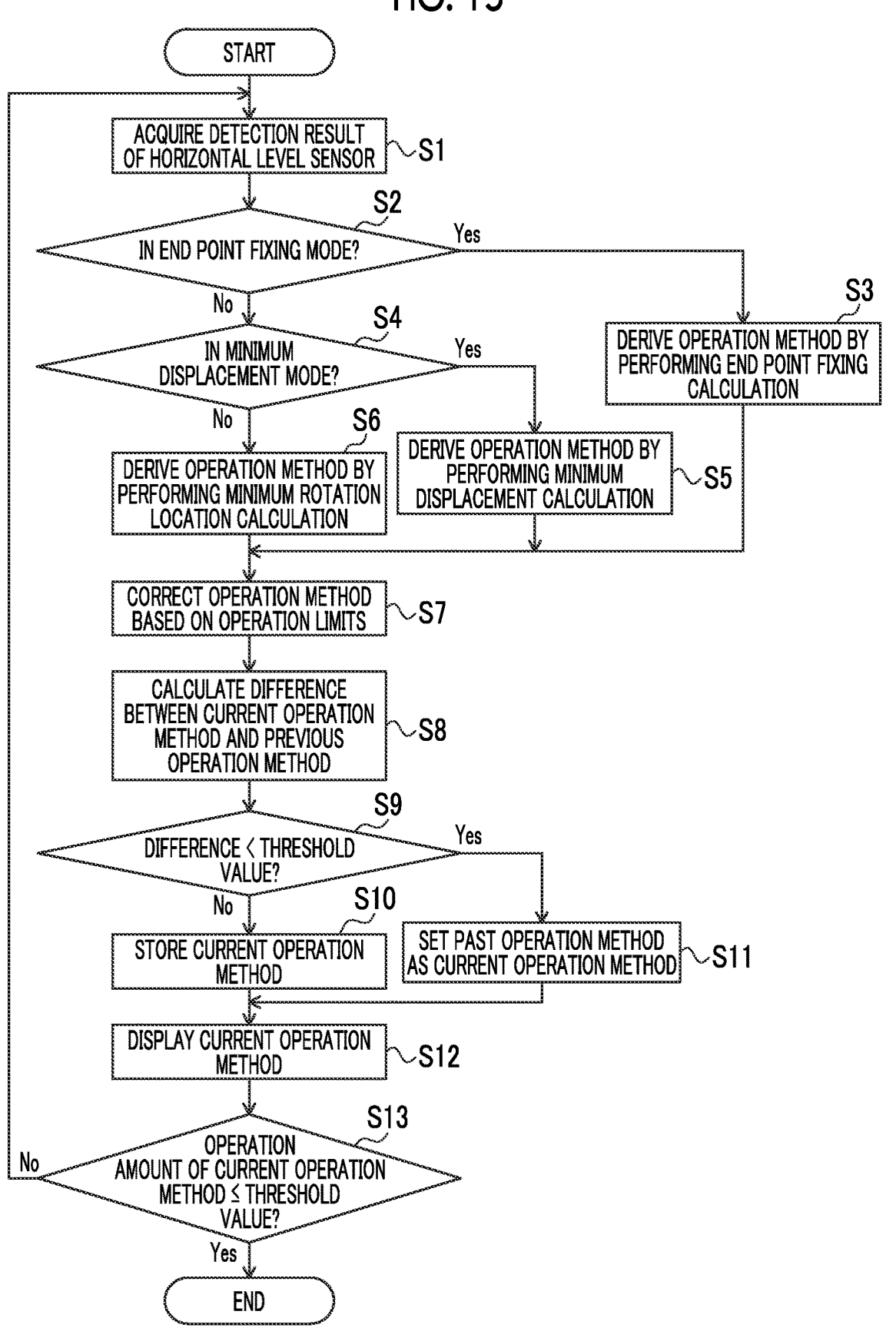
FIG. 15 is a flowchart illustrating an example of processing performed by the control device 4.

FIG. 15 is a flowchart illustrating an example of processing performed by the control device 4. For example, the control device 4 executes the processing illustrated in FIG. 15. For example, it is assumed that any of the end point fixing mode, a minimum displacement mode, and a minimum rotation location calculation mode is set in the control device 4 by an operation from the user.

The end point fixing mode is the mode described in FIG. 11 and FIG. 12. The minimum displacement mode is a mode in which the operation method (rotation method) of the adjustment legs 51 to 54 for adjusting the inclination of the projection apparatus 10 is derived such that a total rotation amount of the adjustment legs 51 to 54 is minimized. The minimum rotation location calculation mode is a mode in which the operation method of the adjustment legs 51 to 54 for adjusting the inclination of the projection apparatus 10 is derived such that the number of adjustment legs of the rotation target among the adjustment legs 51 to 54 is minimized.

First, the control device 4 acquires the detection result of the horizontal level sensor 4b (step S1). Next, the control device 4 determines whether or not the end point fixing mode (refer to FIG. 11 and FIG. 12) is set (step S2). In a case where the end point fixing mode is set (step S2: Yes), the control device 4 derives the operation method of the adjustment legs 51 to 54 by performing end point fixing calculation based on the detection result of the horizontal level sensor 4b acquired in step S1 (step S3), and transitions to step S7. For example, in the end point fixing mode in which the left end of the projection region 11 is fixed, the control device 4 derives the operation method of the adjustment legs 52 and 54 on the right side of the projection apparatus 10 for adjusting the inclination of the projection apparatus 10.

In step S2, in a case where the end point fixing mode is not set (step S2: No), the control device 4 determines whether or not the minimum displacement mode is set (step S4). In a case where the minimum displacement mode is set (step S4: Yes), the control device 4 derives the operation method of the adjustment legs 51 to 54 by performing minimum displacement calculation based on the detection result of the horizontal level sensor 4b acquired in step S1 (step S5), and transitions to step S7. For example, the control device 4 derives an operation method that minimizes the total rotation amount of the adjustment legs 51 to 54, in the operation method of the adjustment legs 51 to 54 for adjusting the inclination of the projection apparatus 10.

In step S4, in a case where the minimum displacement mode is not set (step S4: No), that is, in a case where the minimum rotation location calculation mode is set, the control device 4 derives the operation method of the adjustment legs 51 to 54 by performing minimum rotation location calculation based on the detection result of the horizontal level sensor 4b acquired in step S1 (step S6), and transitions to step S7. For example, the control device 4 derives an operation method that minimizes the number of adjustment legs of the rotation target, in the operation method of the adjustment legs 51 to 54 for adjusting the inclination of the projection apparatus 10.

Next, the control device 4 corrects the operation method derived in any of steps S3, S5, or S6 based on operation limits of the adjustment legs 51 to 54 (step S7). For example, the operation limits of the adjustment legs 51 to 54 are the rightward rotation limit and the leftward rotation limit described in FIG. 7. For example, as described in FIG. 7, the control device 4 determines the insertion depth of each of the adjustment legs 51 to 54 and specifies a rotatable direction and a rotatable amount of each of the adjustment legs 51 to 54. The control device 4 corrects the operation method based on the specified rotatable direction and rotatable amount.

As an example, the control device 4 derives an operation method of rotating only the adjustment leg 51 once rightward in any of steps S3, S5, or S6. However, in a case where the adjustment leg 51 cannot be further rotated rightward because of the rightward rotation limit, the operation method is corrected to an operation method of rotating each of the adjustment legs 52 to 54 once in a leftward direction. In a case where the operation method derived in any of steps S3, S5, or S6 does not exceed the operation limits, the control device 4 maintains the derived operation method.

The operation method that is derived in steps S3, S5, or S6 and is corrected or maintained in step S7 will be referred to as the current operation method. Next, the control device 4 calculates a difference between the current operation method after step S7 and a previous operation method (step S8). The previous operation method is a projection method displayed previously and is stored in a memory of the control device 4 in step S10 described later. In the first time, the previous operation method is not present, and thus, the difference in step S8 is zero. For example, the difference between the current operation method and the previous operation method is obtained by calculating a difference between a rotation amount in the current operation method and a rotation amount in the previous operation method for each of the adjustment legs 51 to 54, and calculating a total (or an average) of the calculated differences.

Next, the control device 4 determines whether or not the calculated difference between the current operation method and the previous operation method in step S8 is less than a predetermined threshold value (step S9). In a case where the difference is not less than the threshold value (step S9: No), the control device 4 stores the current operation method in the memory of the control device 4 as a past operation method in subsequent processing (step S10), and transitions to step S12.

In step S9, in a case where the difference is less than the threshold value (step S9: Yes), the control device 4 sets the past operation method stored in the memory of the control device 4 as the current operation method (step S11), and transitions to step S12. Accordingly, in a case where the difference between the current operation method and the previous operation method is small, that is, in a case where the amount of change in the inclination of the projection apparatus 10 per hour is less than a threshold value (predetermined amount of change), it is possible not to update the guide information 50.

Next, the control device 4 displays the current operation method to the user (step S12). For example, the control device 4 projects the guide information 50 including the operation method information 57 indicating the current operation method to the projection object 6 from the projection portion 1.

Next, the control device 4 determines whether or not an operation amount of the current operation method is less than or equal to a predetermined threshold value (step S13). For example, the operation amount of the current operation method is a total of the rotation amounts in the current operation method for each of the adjustment legs 51 to 54. In a case where the operation amount is not less than or equal to the threshold value (step S13: No), it can be determined that the inclination of the projection apparatus 10 is still large. Thus, the control device 4 returns to step S1.

In step S13, in a case where the operation amount is less than or equal to the threshold value (step S13: Yes), it can be determined that the inclination of the projection apparatus 10 is sufficiently decreased. Thus, the control device 4 finishes the series of processing. At this point, as described above, the control device 4 may further adjust the inclination of the projection region 11 by processing the projection image to be projected from the projection portion 1.

Modification Example 1

Figure 16:
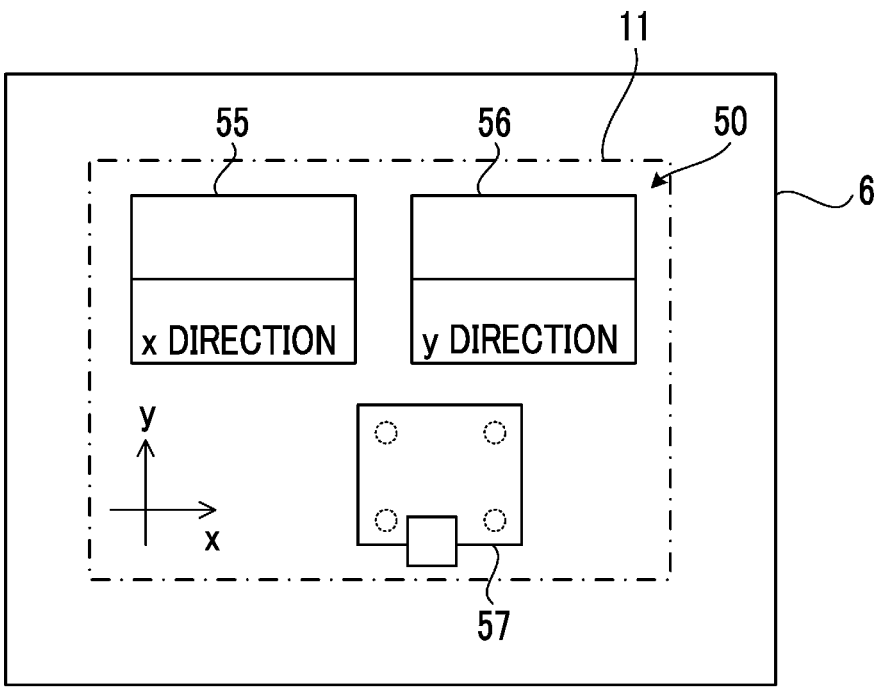
FIG. 16 is a diagram illustrating a modification example of the adjustment mechanism that adjusts inclination of the projection apparatus 10.
Figure 16:
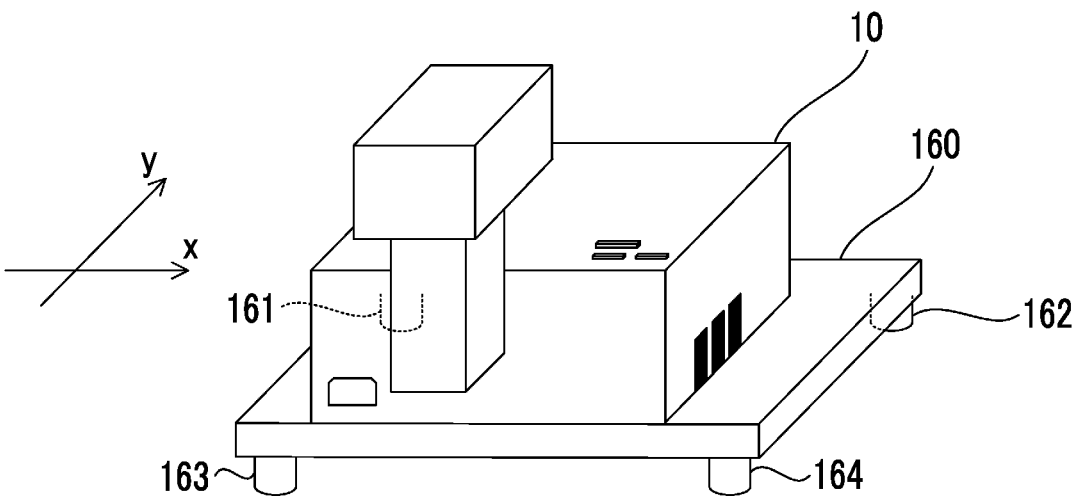

FIG. 16 is a diagram illustrating a modification example of the adjustment mechanism that adjusts the inclination of the projection apparatus 10. While the adjustment legs 51 to 54 provided in the projection apparatus 10 have been described as the adjustment mechanism that adjusts the inclination of the projection apparatus 10, the adjustment mechanism may not be provided in the projection apparatus 10.

For example, as illustrated in FIG. 16, the projection apparatus 10 may be installed on an adjustment table 160, and adjustment legs 161 to 164 may be provided on a bottom surface of the adjustment table 160 as the adjustment mechanism. The adjustment legs 161 to 164 have the same configurations as the adjustment legs 51 to 54. Accordingly, the inclination of the projection apparatus 10 installed on the adjustment table 160 can be adjusted by rotating at least any of the adjustment legs 161 to 164 provided on the bottom surface of the adjustment table 160.

In such a configuration, how the inclination of the projection apparatus 10 is changed by rotating each of the adjustment legs 161 to 164, that is, a relationship between operations of the adjustment legs 161 to 164 and a change in the inclination of the projection apparatus 10, is not known in the control device 4. Accordingly, the control device 4 may perform calibration for specifying the relationship.

For example, in the state illustrated in FIG. 16, the control device 4 prompts the user to perform a specific operation on the adjustment legs 161 to 164 and then, measures a change in the inclination of the projection apparatus 10 indicated by the detection result of the horizontal level sensor 4b. Various methods such as projection using the projection portion 1, voice output using a speaker, and screen output using a display can be used as a method of prompting the specific operation.

As an example, the control device 4 prompts the user to rotate the adjustment leg 161 once rightward and then, measures a change in the inclination of the projection apparatus 10 indicated by the detection result of the horizontal level sensor 4b. Accordingly, a change in the inclination of the projection apparatus 10 in a case where the adjustment leg 161 is rotated once rightward can be measured.

By repeating such processing while changing the adjustment leg of the rotation target, a rotation amount, a rotation direction, and the like, the relationship between the operations of the adjustment legs 161 to 164 and a change in the inclination of the projection apparatus 10 can be specified. Then, the control device 4 derives an operation method of the adjustment legs 161 to 164 for adjusting the inclination of the projection apparatus 10 based on the specified relationship and the detection result of the horizontal level sensor 4b, generates the guide information 50 indicating the derived operation method, and projects the guide information 50 from the projection portion 1.

By prompting the user to perform the specific operation on the adjustment legs 161 to 164 and measuring a change in the inclination of the projection apparatus 10 indicated by the detection result of the horizontal level sensor 4b, the control device 4 can specify the relationship between the operation of the adjustment legs 161 to 164 and a change in the inclination of the projection apparatus 10. The control device 4 can generate the guide information 50 based on the specified relationship and the detection result of the horizontal level sensor 4b.

Modification Example 2

Figure 17:
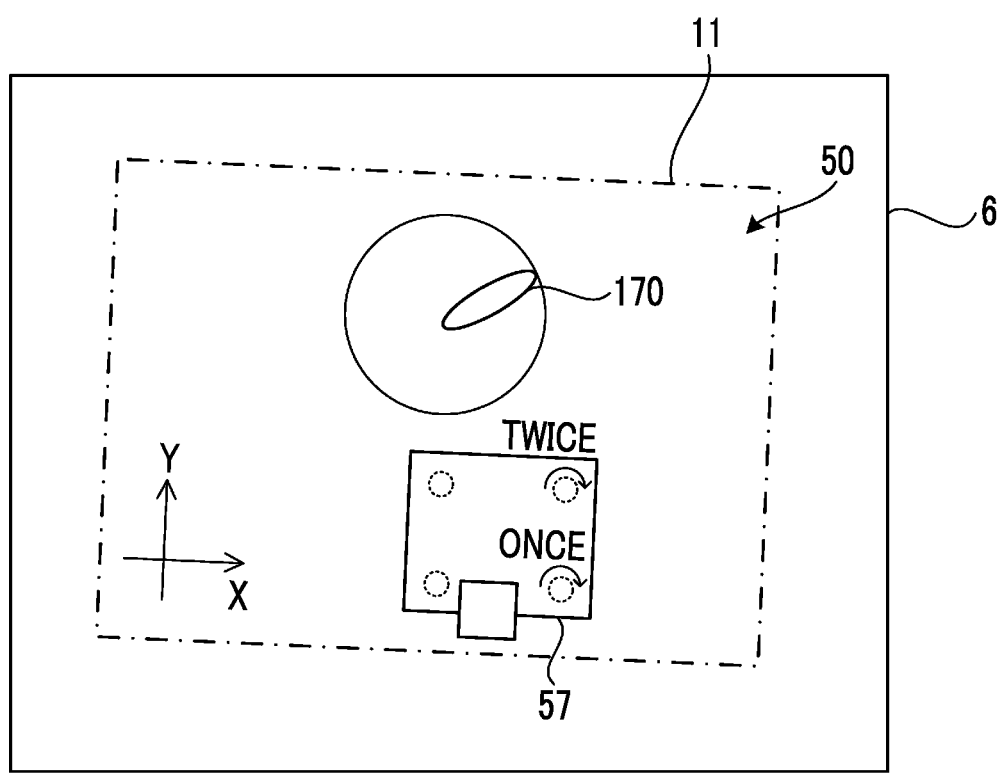
FIG. 17 is a diagram (Part 1) illustrating a modification example of inclination state information.
Figure 17:
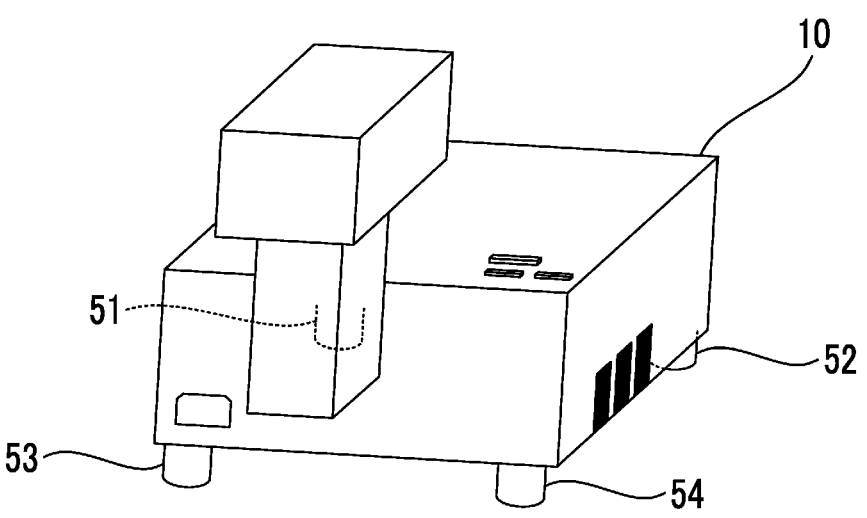
Figure 18:
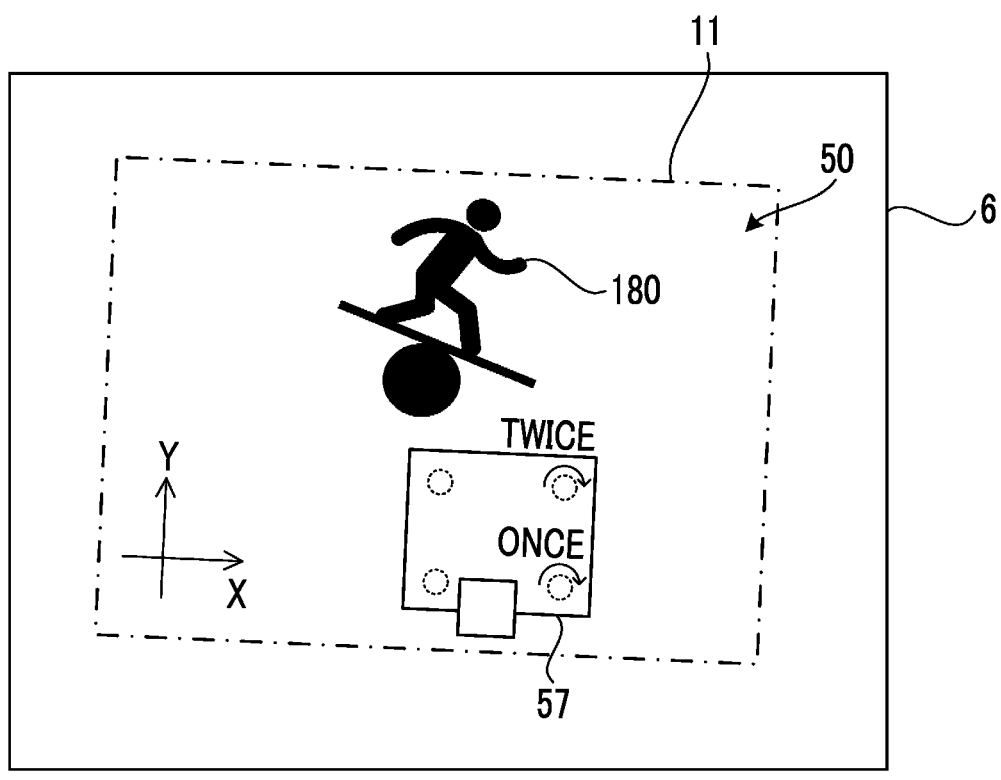
FIG. 18 is a diagram (Part 2) illustrating a modification example of the inclination state information.
Figure 18:
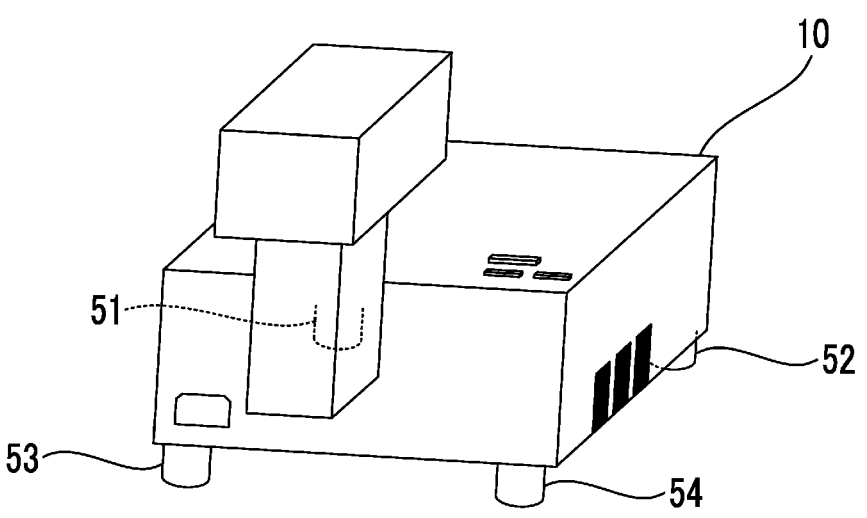

FIG. 17 and FIG. 18 are diagrams illustrating a modification example of the inclination state information. While the inclination state information 55 and 56 have been described as information for notifying the user of the detection result of the horizontal level sensor 4b, the inclination state information is not limited to the inclination state information 55 and 56.

For example, as illustrated in FIG. 17, the control device 4 may project the guide information 50 including inclination state information 170 from the projection portion 1 as the information for notifying the user of the detection result of the horizontal level sensor 4b. The inclination state information 170 indicates a direction in which the projection apparatus 10 is inclined (a direction in which the projection apparatus 10 is lowered) and an inclination degree as an ellipse in a circular frame.

Alternatively, as illustrated in FIG. 18, the control device 4 may project the guide information 50 including inclination state information 180 from the projection portion 1 as the information for notifying the user of the detection result of the horizontal level sensor 4b. The inclination state information 180 indicates the direction in which the projection apparatus 10 is inclined and the inclination degree using an illustration.

Modification Example 3

While a configuration of outputting the guide information including the operation method for adjusting the inclination of the projection apparatus 10 by projection has been described, the present invention is not limited to such a configuration. For example, the control device 4 may output the guide information 50 using voice output using a speaker, screen output using a display, and the like.

Modification Example 4

While a configuration in which the guide information 50 includes the inclination state information 55 and 56 has been described, the guide information 50 may not include the inclination state information 55 and 56.

Modification Example 5

While a configuration in which the control device 4 acquires the inclination information of the projection apparatus 10 using the horizontal level sensor 4b comprised in the projection apparatus 10 has been described, the present invention is not limited to such a configuration. For example, the control device 4 may acquire the inclination information indicating the inclination of the projection apparatus 10 based on an image obtained by capturing the projection image of the projection apparatus 10 on the projection object 6 or an image of the projection apparatus 10 using an imaging apparatus.

For example, the imaging apparatus is an imaging apparatus that is fixed to have constant inclination. The inclination of the projection apparatus 10 can be detected using the image obtained by capturing the projection image of the projection apparatus 10 or the image of the projection apparatus 10 using the imaging apparatus.

In addition, the imaging apparatus may be an imaging apparatus comprising a horizontal level sensor. In this case, the inclination of the projection apparatus 10 can be detected based on a detection result of the horizontal level sensor of the imaging apparatus for the inclination of the imaging apparatus and the image obtained by capturing the projection image of the projection apparatus 10 or the image of the projection apparatus 10 using the imaging apparatus.

The detection of the inclination of the projection apparatus 10 based on the image obtained by the imaging apparatus may be performed in the imaging apparatus or may be performed in the control device 4.

Modification Example 6

While a case of applying the adjustment support device of the embodiment to the projection apparatus 10 has been described, the present invention is not limited to such a configuration. For example, the adjustment support device of the embodiment may be other apparatuses that can directly or indirectly communicate with the projection apparatus 10. For example, the adjustment support device of the embodiment may be a personal computer that can communicate with the projection apparatus 10. In this case, the adjustment support device of the embodiment communicates with the projection apparatus 10 to execute the processing of the adjustment support.

At least the following matters are disclosed in the present specification.

(1)

An adjustment support device comprising a processor configured to perform a control of generating guide information indicating an operation method of an adjustment mechanism for adjusting inclination of a projection apparatus with respect to a reference surface based on inclination information indicating the inclination, and outputting the generated guide information.

(2)

The adjustment support device according to (1), in which the processor is configured to perform a control of outputting the guide information by performing projection using the projection apparatus.

(3)

The adjustment support device according to (1) or (2), in which the adjustment mechanism includes an adjustment leg of which a height changes by rotation, and the guide information indicates a rotation method of the adjustment leg for adjusting the inclination of the projection apparatus.

(4)

The adjustment support device according to (3), in which the rotation method of the adjustment leg includes at least any of a rotation direction of the adjustment leg or a rotation amount of the adjustment leg.

(5)

The adjustment support device according to (3) or (4), in which the adjustment mechanism includes a plurality of the adjustment legs of which heights change by rotation, and the guide information indicates an adjustment leg of a rotation target for adjusting the inclination of the projection apparatus among the plurality of adjustment legs.

(6)

The adjustment support device according to any one of (1) to (5), in which the processor is configured to perform a control of generating the guide information based on information indicating a state of the adjustment mechanism.

(7)

The adjustment support device according to any one of (1) to (6), in which the processor is configured to perform a control of generating the guide information based on information indicating a limit of an operation of the adjustment mechanism.

(8)

The adjustment support device according to any one of (1) to (7), in which the processor is configured to perform a control of updating the guide information in accordance with a change in the inclination of the projection apparatus and outputting the updated guide information.

(9)

The adjustment support device according to (8), in which the processor is configured to perform a control of updating the guide information in a case where an amount of change in the inclination of the projection apparatus is greater than or equal to a predetermined amount of change.

(10)

The adjustment support device according to any one of (1) to (9), in which the processor is configured to perform a control of specifying a relationship between an operation of the adjustment mechanism and a change in the inclination of the projection apparatus by prompting a user to perform a specific operation on the adjustment mechanism and by measuring the change in the inclination of the projection apparatus indicated by the inclination information, and generating the guide information based on the specified relationship and the inclination information.

(11)

The adjustment support device according to any one of (1) to (10), in which the guide information includes information about the inclination of the projection apparatus indicated by the inclination information.

(12)

The adjustment support device according to any one of (1) to (11), in which the guide information includes information for aligning a position of a projection region of the projection apparatus with a position of a projection region of a projection apparatus different from the projection apparatus.

(13)

The adjustment support device according to any one of (1) to (12), in which the projection apparatus is capable of shifting a projection region of the projection apparatus, and the guide information includes information indicating a limit of the shifting.

(14)

The adjustment support device according to any one of (1) to (13), in which the inclination information is information obtained by an inclination sensor provided in the projection apparatus.

(15)

The adjustment support device according to any one of (1) to (13), in which the inclination information is information obtained by capturing a projection image of the projection apparatus or an image of the projection apparatus using an imaging apparatus.

(16)

The adjustment support device according to any one of (1) to (15), further comprising a control portion that causes the projection apparatus to adjust inclination of a projection region of the projection apparatus by processing a projection image in a state where the inclination is adjusted by the adjustment mechanism.

(17)

The adjustment support device according to (16), in which the processor is configured to, in a state where the inclination of the projection region of the projection apparatus is adjusted by processing the projection image, perform a control of outputting information indicating a state of the projection region of the projection apparatus before being adjusted by processing the projection image.

(18)

An adjustment support method comprising, by a processor, performing a control of generating guide information indicating an operation method of an adjustment mechanism for adjusting inclination of a projection apparatus with respect to a reference surface based on inclination information indicating the inclination, and outputting the generated guide information.

(19)

The adjustment support method according to (18), in which the processor is configured to perform a control of outputting the guide information by performing projection using the projection apparatus.

(20)

The adjustment support method according to (18) or (19), in which the adjustment mechanism includes an adjustment leg of which a height changes by rotation, and the guide information indicates a rotation method of the adjustment leg for adjusting the inclination of the projection apparatus.

(21)

The adjustment support method according to (20), in which the rotation method of the adjustment leg includes at least any of a rotation direction of the adjustment leg or a rotation amount of the adjustment leg.

(22)

The adjustment support method according to (20) or (21), in which the adjustment mechanism includes a plurality of the adjustment legs of which heights change by rotation, and the guide information indicates an adjustment leg of a rotation target for adjusting the inclination of the projection apparatus among the plurality of adjustment legs.

(23)

The adjustment support method according to any one of (18) to (22), in which the processor is configured to perform a control of generating the guide information based on information indicating a state of the adjustment mechanism.

(24)

The adjustment support method according to any one of (18) to (23), in which the processor is configured to perform a control of generating the guide information based on information indicating a limit of an operation of the adjustment mechanism.

The adjustment support method according to any one of (18) to (24), in which the processor is configured to perform a control of updating the guide information in accordance with a change in the inclination of the projection apparatus and outputting the updated guide information.

(26)

The adjustment support method according to (25), in which the processor is configured to perform a control of updating the guide information in a case where an amount of change in the inclination of the projection apparatus is greater than or equal to a predetermined amount of change.

(27)

The adjustment support method according to any one of (18) to (26), in which the processor is configured to perform a control of specifying a relationship between an operation of the adjustment mechanism and a change in the inclination of the projection apparatus by prompting a user to perform a specific operation on the adjustment mechanism and by measuring the change in the inclination of the projection apparatus indicated by the inclination information, and generating the guide information based on the specified relationship and the inclination information.

(28)

The adjustment support method according to any one of (18) to (27), in which the guide information includes information about the inclination of the projection apparatus indicated by the inclination information.

(29)

The adjustment support method according to any one of (18) to (28), in which the guide information includes information for aligning a position of a projection region of the projection apparatus with a position of a projection region of a projection apparatus different from the projection apparatus.

(30)

The adjustment support method according to any one of (18) to (29), in which the projection apparatus is capable of shifting a projection region of the projection apparatus, and the guide information includes information indicating a limit of the shifting.

(31)

The adjustment support method according to any one of (18) to (30), in which the inclination information is information obtained by an inclination sensor provided in the projection apparatus.

(32)

The adjustment support method according to any one of (18) to (30), in which the inclination information is information obtained by capturing a projection image of the projection apparatus or an image of the projection apparatus using an imaging apparatus.

(33)

The adjustment support method according to any one of (18) to (32), in which a control portion that causes the projection apparatus to adjust inclination of a projection region of the projection apparatus by processing a projection image in a state where the inclination is adjusted by the adjustment mechanism is provided.

(34)

The adjustment support method according to (33), in which the processor is configured to, in a state where the inclination of the projection region of the projection apparatus is adjusted by processing the projection image, perform a control of outputting information indicating a state of the projection region of the projection apparatus before being adjusted by processing the projection image.

(35)

An adjustment support program causing a processor to execute a process comprising generating guide information indicating an operation method of an adjustment mechanism for adjusting inclination of a projection apparatus with respect to a reference surface based on inclination information indicating the inclination, and outputting the generated guide information.

(36)

A projection system comprising a projection apparatus, and an adjustment support device that generates guide information indicating an operation method of an adjustment mechanism for adjusting inclination of a projection apparatus with respect to a reference surface based on inclination information indicating the inclination, and outputs the generated guide information.

While various embodiments have been described above with reference to the drawings, the present invention is not limited to such examples. It is apparent that those skilled in the art may perceive various modification examples or correction examples within the scope disclosed in the claims, and those examples are also understood as falling in the technical scope of the present invention. In addition, any combination of various constituents in the embodiment may be used without departing from the gist of the invention.

The present application is based on Japanese Patent Application (JP2020-144976) filed on Aug. 28, 2020, the content of which is incorporated in the present application by reference.

EXPLANATION OF REFERENCES

1: projection portion
2: operation reception portion
2A, 3A: hollow portion
2a, 2b, 3a, 3c, 15a: opening
4: control device
4a: storage medium
4b: horizontal level sensor
6: projection object
10, 10A, 10B: projection apparatus
10B: projection apparatus 10A
11, 11A, 11B: projection region
11B: projection region 11A
12: light modulation unit
15: housing
21: light source
22: light modulation portion
23: projection optical system
24: control circuit
31: second optical system
32, 122: reflective member
33: third optical system
34: lens
50, 50A, 50B: guide information
51 to 54, 161 to 164: adjustment leg
51b: screw hole
51c: screw portion
55, 56, 170, 180: inclination state information
57: operation method information
71 to 73: optical sensor
91A, 91B: positional reference line
91B: reference line
101: body part
102: first member
103: second member
104: projection direction changing mechanism
105: shift mechanism
106: optical unit
121: first optical system
131A, 131B: shift limit line

24

131B: shift limit line 131A
141: frame line
160: adjustment table
G1: image

What is claimed is:
1. An adjustment support device comprising:
a processor configured to perform a control of:
generating guide information indicating an operation method of an adjustment mechanism for adjusting inclination of a projection apparatus with respect to a reference surface based on inclination information indicating the inclination; and
outputting the generated guide information on a display,
wherein the adjustment mechanism includes an adjustment leg of which a height changes by rotation of the adjustment leg, and
the guide information indicates at least one of a rotation direction of the adjustment leg or a rotation amount of the adjustment leg for adjusting the inclination of the projection apparatus.
2. The adjustment support device according to claim 1, wherein the processor is configured to perform a control of outputting the guide information by performing projection by the projection apparatus.
3. The adjustment support device according to claim 1, wherein the adjustment mechanism includes a plurality of adjustment legs each of which height changes by rotation of the each of the plurality of adjustment legs, and
the guide information indicates an adjustment leg of a rotation target for adjusting the inclination of the projection apparatus among the plurality of adjustment legs.
4. The adjustment support device according to claim 1, wherein the processor is configured to perform a control of generating the guide information based on information indicating a state of the adjustment mechanism.
5. The adjustment support device according to claim 1, wherein the processor is configured to perform a control of generating the guide information based on information indicating a limit of an operation of the adjustment mechanism.
6. The adjustment support device according to claim 1, wherein the processor is configured to perform a control of updating the guide information in accordance with a change in the inclination of the projection apparatus and outputting the updated guide information.
7. The adjustment support device according to claim 6, wherein the processor is configured to perform a control of updating the guide information in a case where an amount of change in the inclination of the projection apparatus is greater than or equal to a predetermined amount of change.
8. The adjustment support device according to claim 1, wherein the processor is configured to perform a control of specifying a relationship between an operation of the adjustment mechanism and a change in the inclination of the projection apparatus by prompting a user to perform a specific operation on the adjustment mechanism and by measuring the change in the inclination of the projection apparatus indicated by the inclination information, and generating the guide information based on the specified relationship and the inclination information.

9. The adjustment support device according to claim 1, wherein the guide information includes information about the inclination of the projection apparatus indicated by the inclination information.

10. The adjustment support device according to claim 1, wherein the guide information includes information for aligning a position of a projection region of the projection apparatus with a position of a projection region of a projection apparatus different from the projection apparatus.

11. The adjustment support device according to claim 1, wherein the projection apparatus is capable of shifting a projection region of the projection apparatus, and the guide information includes information indicating a limit of the shifting.

12. The adjustment support device according to claim 1, wherein the inclination information is information obtained by an inclination sensor provided in the projection apparatus.

13. The adjustment support device according to claim 1, wherein the inclination information is information obtained by capturing, by an imaging apparatus, a projection image of the projection apparatus or an image of the projection apparatus.

14. The adjustment support device according to claim 1, further comprising:
a controller that causes the projection apparatus to adjust inclination of a projection region of the projection apparatus by processing a projection image in a state where the inclination is adjusted by the adjustment mechanism.

15. The adjustment support device according to claim 14, wherein the processor is configured to, in a state where the inclination of the projection region of the projection apparatus is adjusted by processing the projection image, perform a control of outputting information indicating a state of the projection region of the projection apparatus before being adjusted by processing the projection image.

16. The adjustment support device of claim 1, wherein the adjustment mechanism includes a plurality of adjustment legs, and the outputting of the generated guide information includes displaying on the display an image including a representation of each of the plurality of adjustment legs of the adjustment mechanism and an indication for at least one of the plurality of adjustment legs that indicates at least one of the rotation direction of the respective adjustment leg or the rotation amount of the respective adjustment leg for adjusting the inclination of the projection apparatus.

17. An adjustment support method comprising:
by a processor,
performing a control of:
generating guide information indicating an operation method of an adjustment mechanism for adjusting inclination of a projection apparatus with respect to a reference surface based on inclination information indicating the inclination; and
outputting the generated guide information on a display,
wherein the adjustment mechanism includes an adjustment leg of which a height changes by rotation of the adjustment leg, and
the guide information indicates at least one of a rotation direction of the adjustment leg or a rotation amount of the adjustment leg for adjusting the inclination of the projection apparatus.

18. A projection system comprising:
a projection apparatus; and
an adjustment support device that generates guide information indicating an operation method of an adjustment mechanism for adjusting inclination of the projection apparatus with respect to a reference surface based on inclination information indicating the inclination, and outputs the generated guide information on a display,
wherein the adjustment mechanism includes an adjustment leg of which a height changes by rotation of the adjustment leg, and
the guide information indicates at least one of a rotation direction of the adjustment leg or a rotation amount of the adjustment leg for adjusting the inclination of the projection apparatus.

* * * * *